United States Patent
Ueda

(10) Patent No.: US 7,969,230 B2
(45) Date of Patent: Jun. 28, 2011

(54) VOLTAGE GENERATING CIRCUIT

(75) Inventor: Yuuichi Ueda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/404,902

(22) Filed: Mar. 16, 2009

(65) Prior Publication Data

US 2009/0237149 A1 Sep. 24, 2009

(30) Foreign Application Priority Data

Mar. 18, 2008 (JP) ................... 2008-070205

(51) Int. Cl.
*G05F 1/10* (2006.01)
*G05F 3/02* (2006.01)

(52) U.S. Cl. ....................................... 327/536
(58) Field of Classification Search .................... 327/536
See application file for complete search history.

(56) References Cited

U.S. PATENT DOCUMENTS

| | | | | |
|---|---|---|---|---|
| 6,501,325 B1 * | 12/2002 | Meng | ............ | 327/536 |
| 7,259,612 B2 * | 8/2007 | Saether | ............ | 327/536 |
| 2002/0130703 A1 * | 9/2002 | Tsai | ............ | 327/536 |

FOREIGN PATENT DOCUMENTS

| | | |
|---|---|---|
| JP | 2003-88102 | 3/2003 |
| JP | 2004-23990 | 1/2004 |
| JP | 2005-339658 | 12/2005 |
| JP | 2008-125349 | 5/2008 |

OTHER PUBLICATIONS

Ker, Ming-Dou, et al., "Design of Charge Pump Circuit With Consideration of Gate-Oxide Reliability in Low-Voltage CMOS Processes", *IEEE Journal of Solid-State Circuits*, vol. 41, No. 5, pp. 1100-1107, May 2006.

* cited by examiner

*Primary Examiner* — Quan Tra
(74) *Attorney, Agent, or Firm* — Cooper & Dunham LLP

(57) ABSTRACT

A charge pump provides high boosting efficiency with low power loss even with a heavy load. Plural charge transfer switches are connected in series forming two lines of charge transfer circuits operated by out-of-phase clock signals. Capacitors are connected to each of nodes in the charge transfer circuits. The charge transfer circuits include a first control unit, a second control unit, and a voltage comparison output unit. The second control unit includes a switch unit configured to selectively feed a signal from a previous-stage node or a later-stage node to the gate of a charge transfer switch in the second control unit, depending on the phase of the clock signal.

1 Claim, 29 Drawing Sheets

VOLTAGE GENERATING CIRCUIT

BACKGROUND OF THE INVENTION

1. Technical Field

This disclosure relates to voltage generating circuits that employ a charge pump circuit.

2. Description of the Related Art

Battery-operated portable devices have limited battery voltages, and so they are designed accordingly. However, such portable devices may sometimes require high voltages for driving a liquid crystal display (LCD) or a light-emitting diode (LED). The most common way of obtaining such high voltages or a large current stably is to use a DC/DC converter. DC/DC converters, however, require discrete elements such as coils, which prevents the reduction of implementation area.

To overcome the above problem, a charge pump circuit is often used, which combines a transistor as a charge transfer element and a capacitor as a pumping element.

FIG. 1 shows a Dickson type charge pump circuit that has conventionally been used as an easy way of constructing a charge pump booster circuit (voltage generating circuit). In the Dickson type charge pump shown in FIG. 1, plural diodes 9111, 9112, and 9113 are connected in series between a power supply node 900 and a boosted output node 9103.

To each of the nodes of the diodes 9111, 9112, and 9113, there is connected one end of each of capacitors 9121 and 9122 via capacitive coupling in order to control the potential at the node. The other ends of the capacitors are fed with complementary clocks so that the odd-numbered capacitor and the even-numbered capacitor are driven in opposite phases.

In this way, a voltage increased from the power supply voltage can be outputted at the output node 9103. For the above diodes, diode-connected N channel MOS transistors (hereafter referred to as "NMOS transistors") are used. The diode-connected NMOS transistors are connected in series.

One disadvantage of this circuit system is said to be that the system is influenced by the forward voltage Vt of the diodes. When an N-stage Dickson type charge pump circuit is used as a booster circuit, an output voltage Vout that is obtained with a power supply voltage VDD is expressed by the following expression:

$$Vout=(N+1)\cdot(VDD-Vt) \qquad (1)$$

where Vt is the forward voltage of the diode.

As shown in Expression (1), due to the influence of a potential drop by the forward voltage Vt of the diode, a power loss of Vt·Iout is caused per diode. Thus, in the N-stage Dickson type charge pump circuit as a whole, power loss that is caused is expressed by:

$$(N+1)\cdot Vt\cdot Iout \qquad (2)$$

Thus, efficiency is very poor particularly in the case of a heavy load with a large output current (Iout).

The problem has been tackled by various circuit structures. One of the most common techniques is to use a charge transfer switch (which may be hereafter referred to as "CTS") instead of a diode. A CTS is generally constructed of a MOS transistor. When given a bias voltage above a threshold voltage Vth, the CTS turns on, whereby the drain-source voltage becomes substantially zero, thus eliminating the influence of Vt that has been causing the aforementioned problem in the Dickson type charge pump circuit.

FIG. 2 shows an example of a charge pump circuit disclosed in Japanese Laid-Open Patent Application No. 2005-339658 (hereafter referred to as Patent Document 1), which is constructed according to the above technology, using NMOS transistors. In this charge pump circuit, NMOS transistors 9211, 9212, and 9213 are connected in series between a voltage input node 900 and a voltage output node 9205, forming a charge transfer circuit. To the nodes between the NMOS transistors, one ends of capacitors 9221, 9222, and 9223 are connected. The other ends of the capacitors 9221, 9222, and 9223 are driven by clocks of plural phases. The gate of the NMOS transistor in a particular stage of the charge transfer circuit is driven by the clock having the same phase as that of its drain. The gate is connected to the drain of another NMOS transistor disposed on the voltage output node side.

Thus, the circuit according to Patent Document 1 employs NMOS transistors as charge transfer switches, wherein an a-th node 9201 and an (a+1)th node 9202 are connected by the NMOS transistor 9211, for example. The signal at an (a+2)th node 9203 is used as a gate signal for the NMOS transistor 9211, thus using the transistor as a switch. If a positive bias can be fed to the gate terminal of the NMOS transistor, the influence due to the Vt in Expressions (1) and (2) can be eliminated.

However, the circuit according to Patent Document 1 is disadvantageous as described below with reference to FIGS. 3 and 4.

As shown in FIGS. 3 and 4, plural NMOS transistors 9211, 9212, 9213, . . . are connected in series between the voltage input node 900 and the voltage output node, forming a charge transfer circuit. To the nodes 9201, 9202, 9203 . . . between these NMOS transistors, there are connected one ends of the capacitors 9221, 9222, 9223, . . . . As to the other ends of these capacitors, the odd-numbered capacitors are fed with a first clock, while the even-numbered capacitors are fed with a clock with an opposite phase to the first clock.

When the NMOS transistors 9211, 9212, 9213 . . . are driven by the complementary clocks φ and /φ, the odd-numbered and even-numbered ones of the transistors are turned on alternately, so that a positive charge is transferred from the voltage input node 900 to the voltage output node, thus performing a boosting operation.

In the circuit of FIG. 3, as the complementary clocks, the odd-numbered NMOS transistors are fed with GND clock, while the even-numbered NMOS transistors are fed with the VDD potential. In the example shown in FIG. 4, as the complementary clocks, the odd-numbered NMOS transistors are fed with the VDD clock while the even-numbered NMOS transistors are fed with GND.

In the examples shown in FIGS. 3 and 4, the gate of the first NMOS transistor 9211 is connected to the node 9202 between the source of the adjacent second NMOS transistor 9212 and the drain of the third NMOS transistor 9203. Similarly, the gate of each of the subsequent NMOS transistors is connected to the node between an adjacent transistor and a further adjacent transistor.

In FIGS. 3 and 4, the source of the NMOS transistor 9211, as a first-stage charge transfer switch, is connected to the power supply input node 900. A node 9204 is connected to a subsequent-stage node in the charge pump circuit.

As mentioned above, a charge pump booster circuit performs a boosting operation by controlling the on/off of the switches in synchronism with clock signals.

In FIG. 3, when the other terminal of the capacitor 9221 is fed with GND, the other terminal of the capacitor 9222 with VDD, and the other terminal of the capacitor 9223 with GND potentials, the NMOS transistor 9211 turns on, the NMOS transistor 9222 turns off, and the NMOS transistor 9223 turns on. In this state, the node 9201 should have VDD, the node 9202 should have 3×VDD, and the node 9203 should have 3×VDD potentials. With respect to the potential VDD of the power supply input 900, the signal at the node 9202, which is applied to the gate terminal of the NMOS transistor 9211, is 3×VDD, so that the NMOS transistor 9211 turns on.

However, with regard to the NMOS transistor 9212 that should be in the off-state, the potential at the node 9201 is VDD compared to the signal 3×VDD at the gate terminal. As a result, the NMOS transistor 9212 turns on, thus contradicting the desired alternate turning on/off operations between the odd-numbered and even-numbered transistors.

Referring to FIG. 4, when the other terminal of the capacitor 9221 is fed with VDD, the other terminal of the capacitor 9222 with GND, and the other terminal of the capacitor 9223 with VDD potentials, the NMOS transistor 9211 should turn off, the NMOS transistor 9212 should turn on, and the NMOS transistor 9213 should turn off, so that the node 9201 should have 2×VDD, the node 9202 should have 2×VDD, and the node 9203 should have 4×VDD.

However, in the NMOS transistor 9211 that should be turned off, the signal at the node 9202, which is the signal applied to the gate terminal of the MOS transistor 9211, has 2×VDD compared to the potential VDD at the power supply input 900. As a result, the NMOS transistor 9211 turns on, thereby causing the aforementioned contradiction.

In an actual circuit operation, an inverse current flows toward the power supply via the charge transfer switch, so that the voltage cannot be boosted.

Patent Document 1 also discloses a differential circuit configuration in which the signal at a node with an opposite phase is used as the gate signal for a NMOS transistor, so that the transistor can be used as a switch. This circuit structure, as shown in FIG. 5, includes two lines of charge transfer circuits between which corresponding transfer stages are driven with opposite phases. The first transfer circuit includes a group of capacitors 9421, 9423, and 9425; the second transfer circuit includes a group of capacitors 9422, 9424, and 9426. The gate of an NMOS transistor 9411 in the first transfer circuit is connected to a node 9404 between the source of a corresponding NMOS transistor 9412 and the drain of a NMOS transistor 9414 in the second transfer circuit. The gate of the NMOS transistor 9412 on the second transfer circuit side is connected to a node 9403 between the source of a corresponding NMOS transistor 9411 and the drain of a NMOS transistor 9413 on the first transfer circuit side. Each of the subsequent transfer stages has similar connection relationships.

To the nodes 9403, 9405, and 9407 on the first transfer circuit side, there are connected capacitors 9421, 9423, and 9425, respectively. To the nodes 9404, 9406, and 9408 on the second transfer circuit side, there are connected capacitors 9422, 9424, and 9426, respectively.

FIG. 6 shows an example in which VDD and GND are fed as opposite signals. In this configuration too, there is the contradiction. Specifically, when the terminals of capacitor elements 9421, 9424, and 9425 are fed with VDD potential and the terminals of capacitor elements 9422, 9423, and 9426 are fed with GND potential, desirably the NMOS transistors 9411, 9414, and 9415 turn off and the NMOS transistors 9412, 9413, and 9416 turn on. In this case, the node 9401 should have 2×VDD, the node 9402 should have VDD, the node 9403 should have 2×VDD, the node 9404 should have 3×VDD, the node 9405 should have 4×VDD, and the node 9406 should have 3×VDD.

However, the NMOS transistor 9414, which should turn off, causes an inverse current of charges toward the power supply 900 due to the higher potential at the node 9403 than at the node 9402.

To deal with this problem, Ming-Dou Ker, Shin-Lun Chen, and Chia-Shen Tsai proposes in their paper ("Design of Charge Pump Circuit With Consideration of Gate-Oxide Reliability in Low-Voltage CMOS Processes", IEEE Journal of Solid-State Circuit Vol. 41, No. 5 May 2006 (hereafter referred to as "Non-Patent Document 1")) a circuit as shown in FIG. 7. An operation of the circuit will be described with reference to FIG. 8.

As shown in FIG. 7, the circuit includes two lines of charge transfer circuits between which corresponding transfer stages are driven with opposite phases. A first charge transfer circuit includes capacitors 9621 and 9623. A second charge transfer circuit includes capacitors 9622 and 9624. Between nodes 9601 and 9603, there are provided MOS transistors 9613 and 9615. Similarly, between nodes 9602 and 9604, MOS transistors 9614 and 9616 are provided.

The MOS transistors 9613 and 9614 are NMOS transistors; the MOS transistors 9615 and 9616 are P-channel MOS transistors (hereafter referred to as "PMOS transistors"). To an output node 9607, there are connected PMOS transistors 9617 and 9618 to which an output is fed from the respective charge transfer circuits.

The gate of an NMOS transistor 9611 on the first transfer circuit side is connected to the gate of the next-stage NMOS transistor 9613. The gate of the NMOS transistor 9611 is also connected to a node 9602 between a corresponding NMOS transistor 9612 and the NMOS transistor 9614 on the second transfer circuit side. The gate of the NMOS transistor 9612 on the second transfer circuit side is connected to the gate of the next-stage NMOS transistor 9614.

The gate of the NMOS transistor 9612 on the second transfer circuit side is connected to a node 9601 between the corresponding NMOS transistor 9611 and the NMOS transistor 9613 on the first transfer circuit side. Each of the subsequent transfer stages has a similar connection relationship.

To the nodes 9601 and 9603 on the first transfer circuit side, there are connected the capacitors 9621 and 9623, respectively. To the nodes 9602 and 9604 on the second transfer circuit side, there are connected the capacitors 9622 and 9624, respectively.

The other ends of the capacitors 9621 and 9623 and the capacitors 9622 and 9624 are fed with complementary clocks so that the odd-numbered and even-numbered capacitors are driven with opposite phases.

FIG. 8 shows an example in which complementary clocks are provided by VDD and GND. In FIG. 8, when the capacitor elements 9621 and 9624 are fed with VDD, and the capacitor elements 9622 and 9623 with GND, it is necessary that the power supply input 900 and the node 9601 be cut off from each other, the power supply input 900 and the node 9602 be connected, the node 9601 and the node 9605 be connected, the node 9602 and the node 9606 be cut off from each other, the node 9605 and the output terminal 9607 be cut off from each other, and the node 9606 and the output terminal 9607 be connected.

In the circuit according to Patent Document 1 shown in FIG. 6, the inverse current is caused because there is the MOS transistor 9414 alone between the nodes 9402 and 9404. On the other hand, in the circuit according to Non-Patent Document 1 shown in FIG. 8, the PMOS transistor 9614 and the NMOS transistor 9616 are provided between the nodes 9602 and 9606, thereby preventing the inverse current.

How the inverse current can be prevented in the circuit of FIG. 8 is described below.

With regard to the potential relationship between the gate terminal and the drain terminal of PMOS transistor 9614, the potential at the node 9601, which is applied to the gate terminal, is 2×VDD compared to the potential VDD at the node 9602, which is applied to the drain terminal. Thus, the transistor 9614 turns off. Similarly, as regards the NMOS transistor 9616, the potential at the node 9605, which is applied to the gate terminal, is 2×VDD compared to the potential 3×VDD at the node 9606, which is applied to the drain terminal. Thus, the NMOS transistor 9616 turns off.

The PMOS transistor 9614 and the NMOS transistor 9616 never turn on simultaneously no matter what the value of potential V at the node 9604, which is applied to the source terminal of each of the transistors.

This is because the node 9601 and the node 9605, which are connected to the gate terminals of the transistors PMOS 9614 and NMOS 9616, are at the potential 2×VDD. A condition for causing the PMOS transistor 9614 to turn on is given by:

$$V(\text{potential at node 9604}) \geq 2 \times VDD - Vtp \qquad (3)$$

Thus, a condition for causing the NMOS transistor 9616 to turn on is given by:

$$V \leq 2 \times VDD - Vtn \qquad (4)$$

Thus, in order for the two transistors to turn on simultaneously, the following condition must be satisfied:

$$2 \times VDD - Vtp \leq V \leq 2 \times VDD - Vtn \qquad (5)$$

However, given that Vtp has a negative value and Vtn has a positive value, Expression (5) does not hold. Thus, no inverse current is caused in the circuit of FIG. 8.

One disadvantage of the circuit structures shown in FIGS. 7 and 8 is that, because the PMOS and NMOS transistors are connected in series in each stage, the number of the MOS transistors that exist in the charge transfer path between the power supply input and the output terminal is large, which increases the power loss due to the potential drop by the drain-source resistance in each MOS transistor.

The power loss by the drain-source resistance in the 2-stage charge pump booster circuit shown in FIG. 8 is expressed by:

$$Iout \cdot (Rch1 \cdot Rch2)/(Rch1 + Rch2) \qquad (6)$$

where Rch1 and Rch2 each indicate the drain-source resistance of each of the MOS transistors 9611 to 9618 in the on-state, as shown by the following:

$$Rch1 = R9611 + R9613 + R9615 + R9617 \qquad (7)$$

$$Rch2 = R9612 + R9614 + R9616 + R9618 \qquad (8)$$

SUMMARY

In an aspect of this disclosure, there is provided a charge pump booster circuit by which the influence of the drain-source resistance is reduced so that power loss can be minimized and a high boosting efficiency can be obtained even when the load is heavy.

According to an aspect of this disclosure, a voltage generating circuit includes a power supply input node; an output terminal node; and a multi-stage charge pump booster circuit disposed between the power supply input node and the output terminal node.

The multi-stage charge pump booster circuit includes plural charge transfer switches connected in series between the power supply input node and the output terminal node, forming two or more lines of charge transfer circuits that are operated by clock signals that are out of phase with each other.

The multi-stage charge pump booster circuit further includes capacitors connected on one end to nodes of the charge transfer circuits and driven on another end by the out-of-phase clock signals.

The charge transfer circuits include a first control unit, a second control unit, and a voltage comparison output unit. The first control unit includes a charge transfer switch comprising a MOS transistor configured to transfer a charge from the power supply input node to each of the capacitors in a first-stage.

The second control unit includes a charge transfer switch comprising a MOS transistor configured to transfer a charge from a predetermined one of the capacitors in the first stage to each of the capacitors in a next-stage. The second control unit further includes a switch unit configured to selectively supply a signal from a node of the previous stage or a subsequent stage to the gate terminal of the charge transfer switch of the second control unit, depending on the phase of the clock signal.

The voltage comparison output unit includes a charge transfer switch comprising a MOS transistor configured to transfer a charge from each of the capacitors in a final stage to the output node.

According to another aspect, a voltage generating circuit includes a power supply input node; an output terminal node; and a multi-stage charge pump booster circuit disposed between the power supply input node and the output terminal node.

The multi-stage charge pump booster circuit includes plural charge transfer switches connected in series between the power supply input node and the output terminal node, forming two or more lines of charge transfer circuits that are operated by clock signals that are out of phase with each other.

The multi-stage charge pump booster circuit further includes capacitors connected on one end to nodes of the charge transfer circuits and driven on another end by the out-of-phase clock signals. The charge transfer circuits include a first control unit, a second control unit, and a voltage comparison output unit.

The first control unit includes a charge transfer switch comprising a NMOS transistor configured to transfer a charge from the power supply input node to each of the capacitors in a first-stage.

The second control unit includes a charge transfer switch comprising an NMOS transistor configured to transfer a charge from a predetermined one of the capacitors in the first stage to the capacitor in a next stage. The second control unit further includes a switch unit configured to selectively supply a signal from a node of the previous stage or a subsequent stage to the gate terminal of the charge transfer switch of the second control unit, depending on the phase of the clock signal.

The voltage comparison output unit includes a charge transfer switch comprising a PMOS transistor configured to transfer a charge from each of the capacitors in a final stage to the output node.

According to another aspect, a voltage generating circuit includes a power supply input node; an output terminal node; and a multi-stage charge pump booster circuit disposed between the power supply input node and the output terminal node.

The multi-stage charge pump booster circuit includes plural charge transfer switches connected in series between the power supply input node and the output terminal node, forming two or more lines of charge transfer circuits that are operated by clock signals that are out of phase with each other The multi-stage charge pump booster circuit further includes capacitors connected on one end to nodes of the charge transfer circuits and driven on another end by the out-of-phase clock signals. The charge transfer circuits include a first control unit, a second control unit, and a voltage comparison output unit.

The first control unit includes a charge transfer switch comprising a NMOS transistor configured to transfer a charge from the power supply input node to each of the capacitors in a first stage.

The second control unit includes a charge transfer switch comprising a PMOS transistor configured to transfer a charge from a predetermined one of the capacitors in the first stage to the capacitor in a next stage. The second control unit further includes a switch unit configured to selectively supply a signal from a node of the previous stage or the subsequent stage to the gate terminal of the charge transfer switch of the second control unit, depending on the phase of the clock signal.

The voltage comparison output unit includes a charge transfer switch comprising a PMOS transistor configured to transfer a charge from each of the capacitors in a final stage to the output node.

BRIEF DESCRIPTION OF THE DRAWINGS

These and other aspects, features and advantages will be apparent to those skilled in the art from the following detailed description of the invention, when read in conjunction with the accompanying drawings in which.

DETAILED DESCRIPTION OF THE PREFERRED EMBODIMENTS

Figure 1:
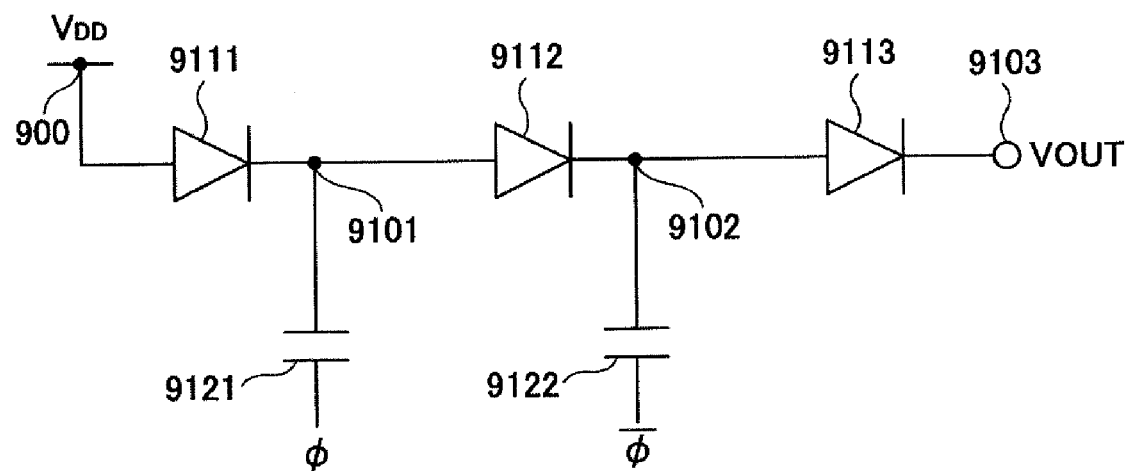
FIG. 1 shows a circuit diagram of a Dickson type charge pump circuit.
Figure 2:
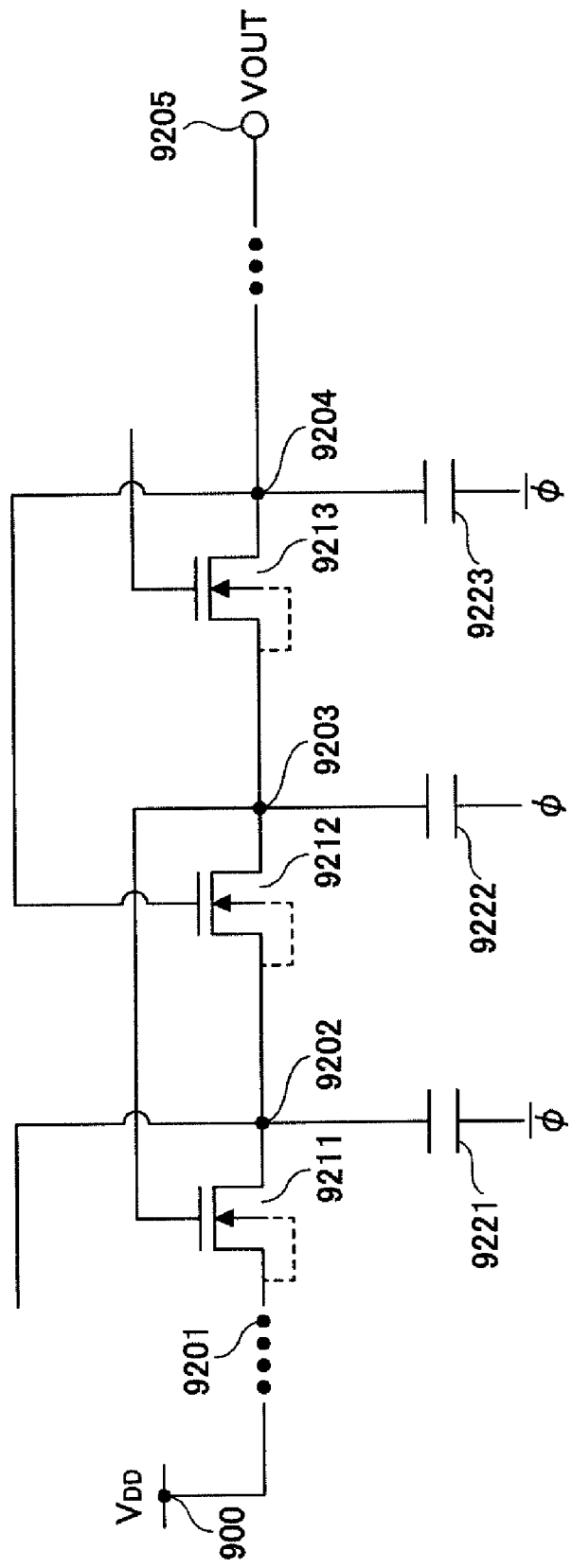
FIG. 2 shows a circuit diagram of a charge pump circuit according to Patent Document 1.
Figure 3:
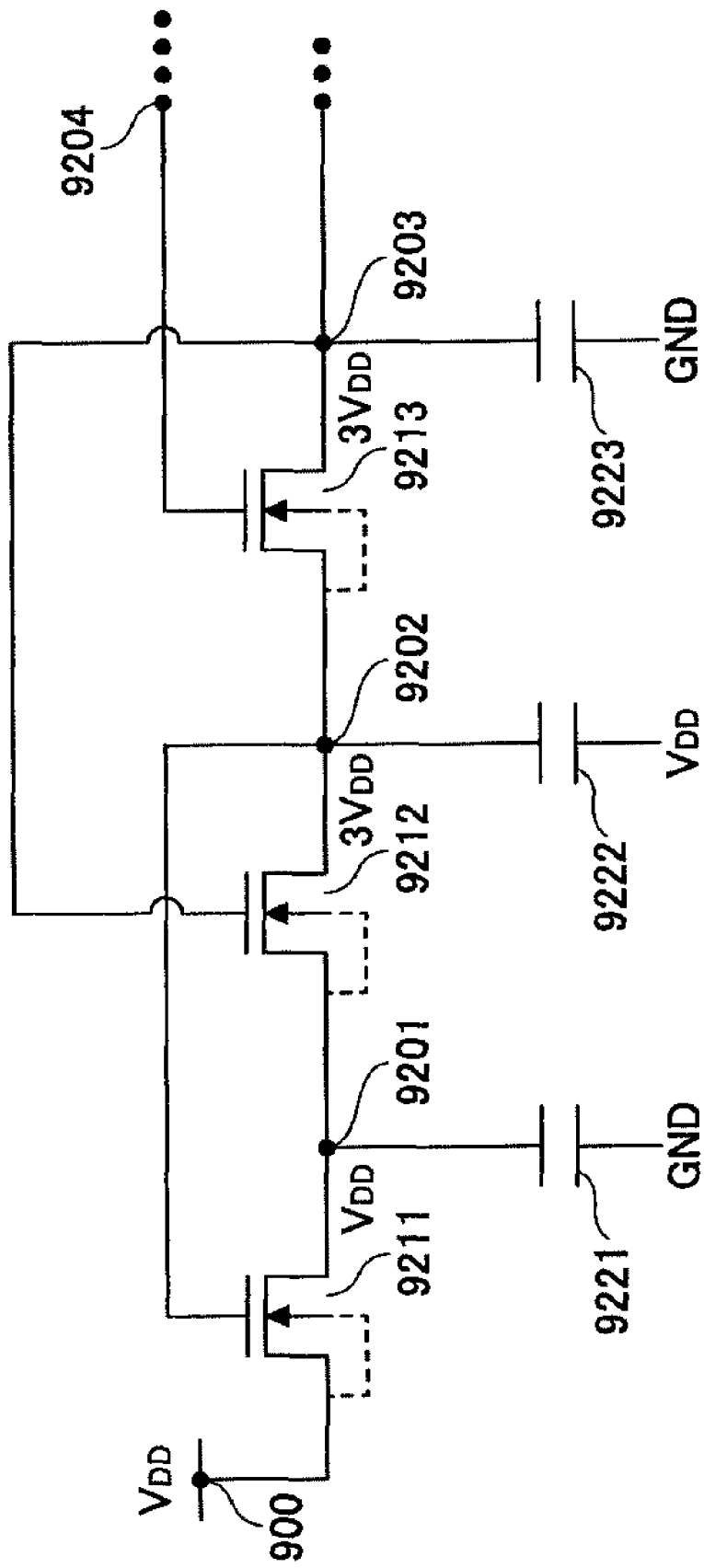
FIG. 3 shows a circuit diagram illustrating an operation of the charge pump circuit according to Patent Document 1.
Figure 4:
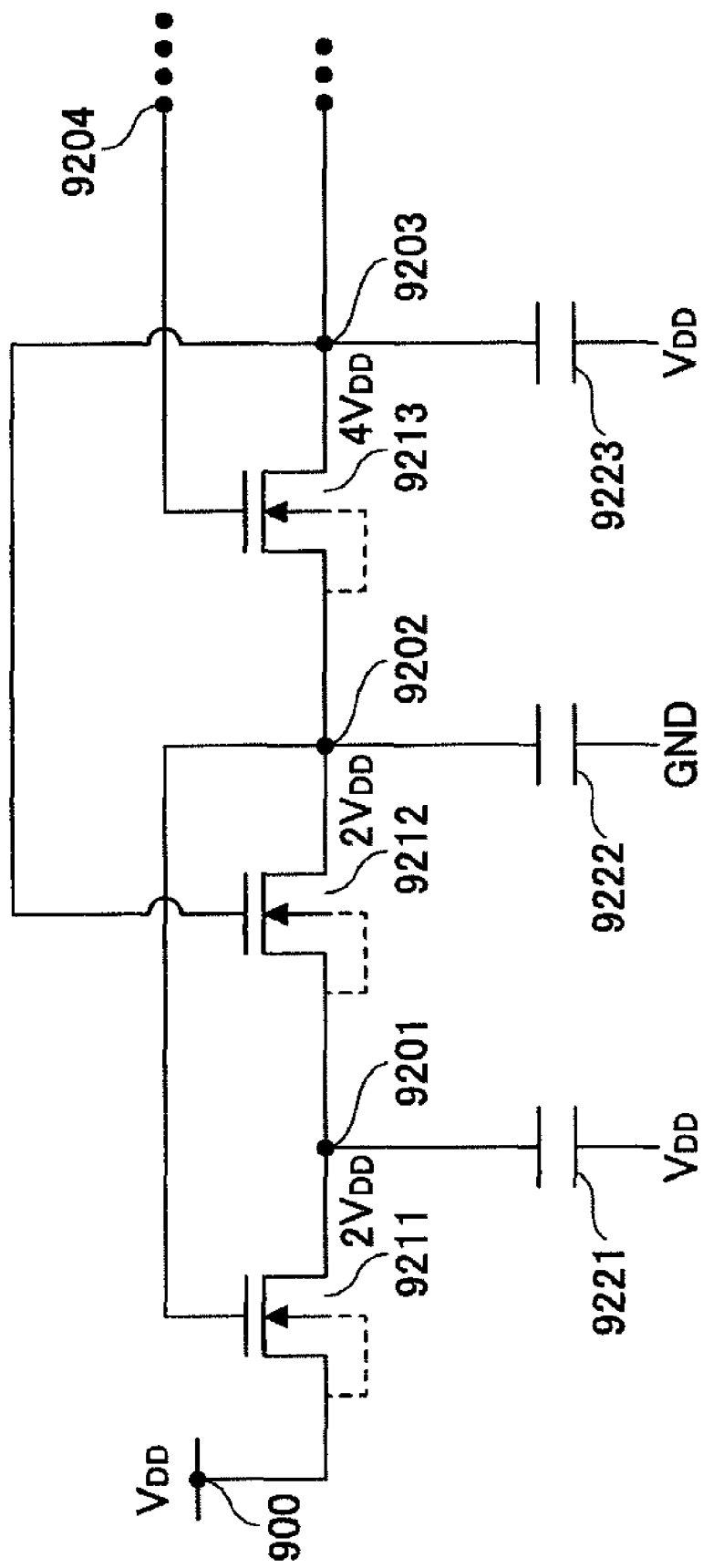
FIG. 4 shows another circuit diagram of the charge pump circuit according to Patent Document 1.
Figure 5:
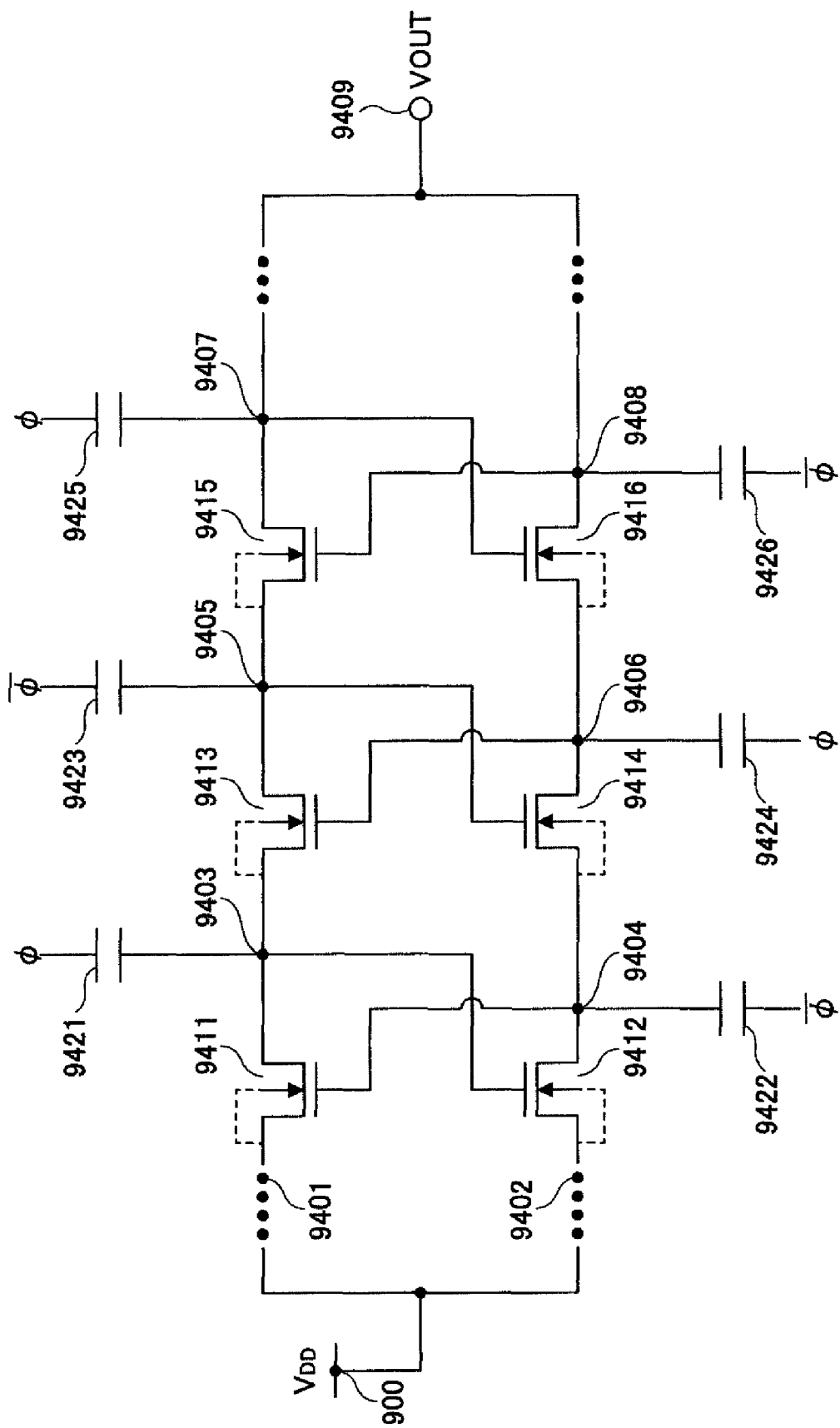
FIG. 5 shows a circuit diagram of another charge pump circuit according to Patent Document 1.
Figure 6:
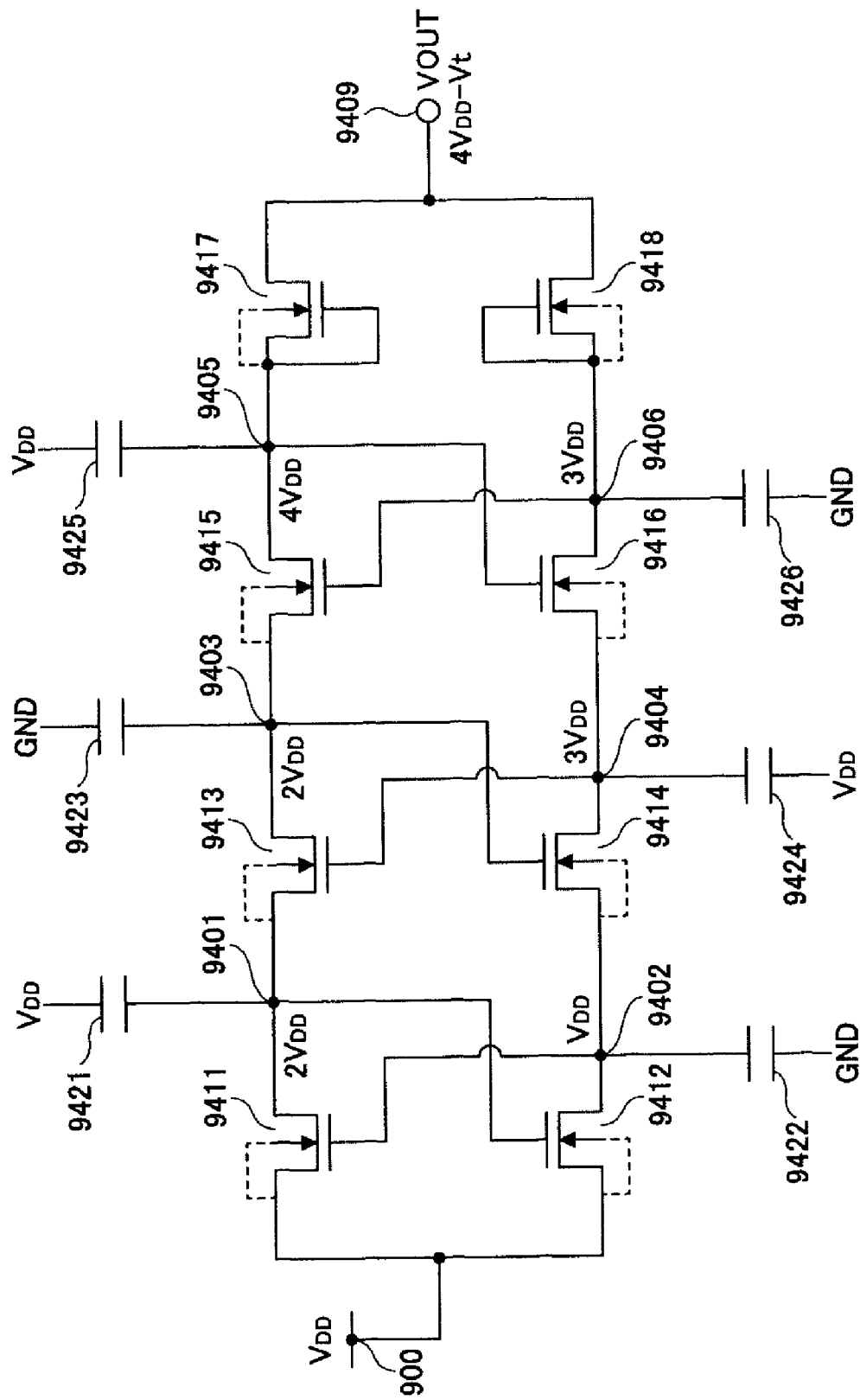
FIG. 6 shows a circuit diagram illustrating an operation of the other charge pump circuit according to Patent Document 1.
Figure 7:
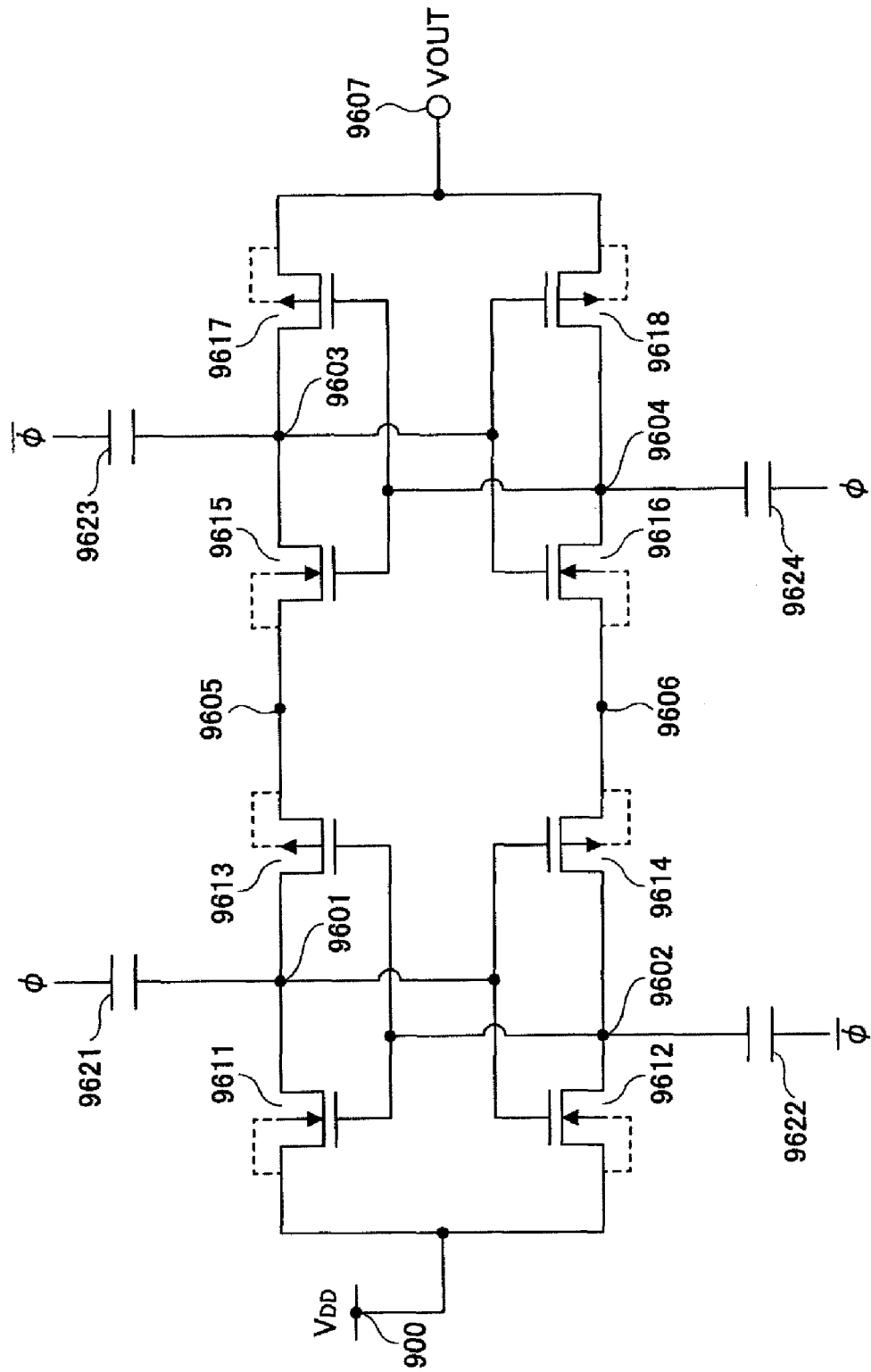
FIG. 7 shows a circuit diagram of a charge pump circuit according to Non-Patent Document 1.
Figure 8:
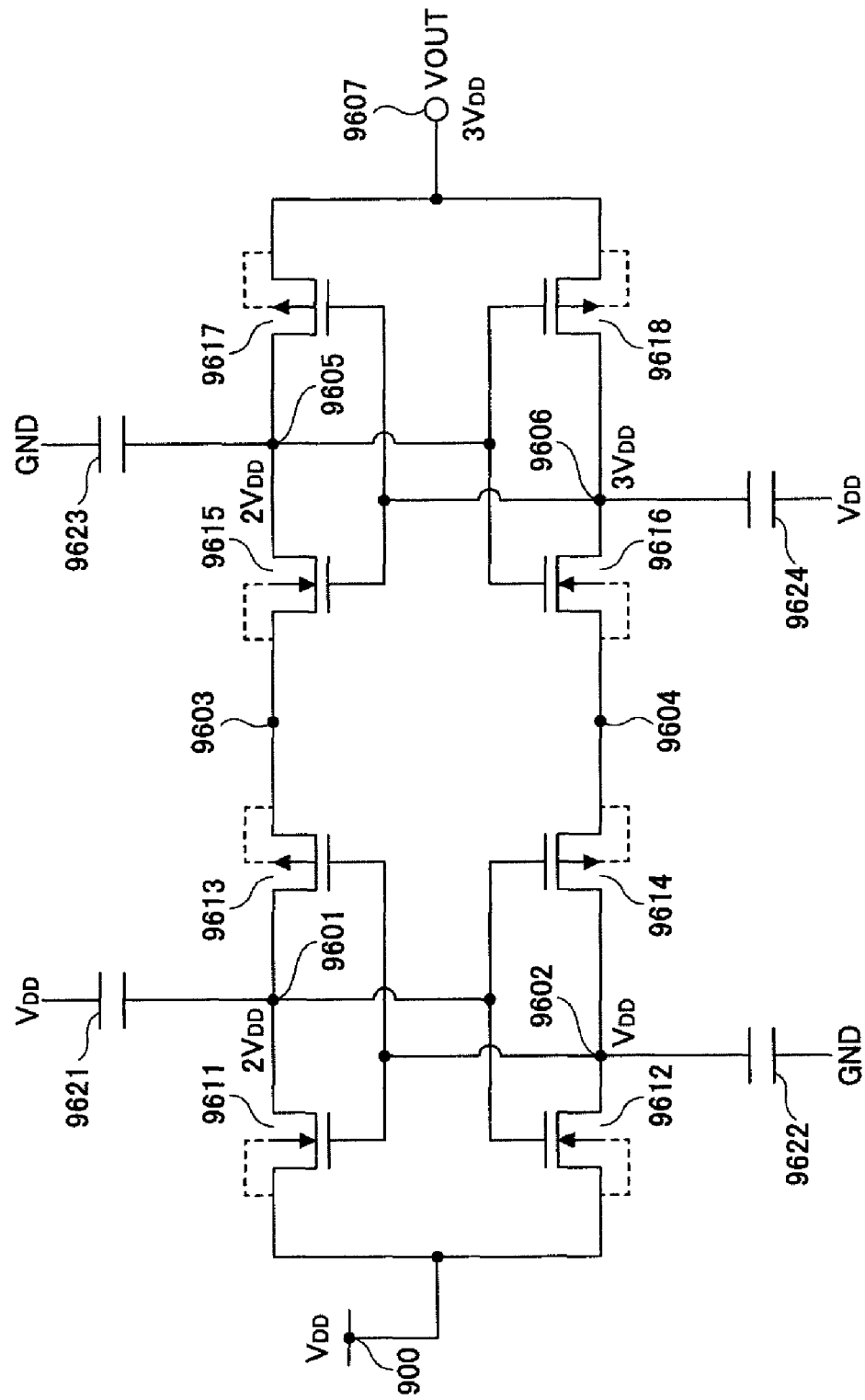
FIG. 8 shows a circuit diagram illustrating an operation of the charge pump circuit according to Non-Patent Document 1.

Embodiments of the present invention are described with reference to the drawings in which like reference numerals designate similar or identical parts throughout the views of the drawings.

Figure 9:
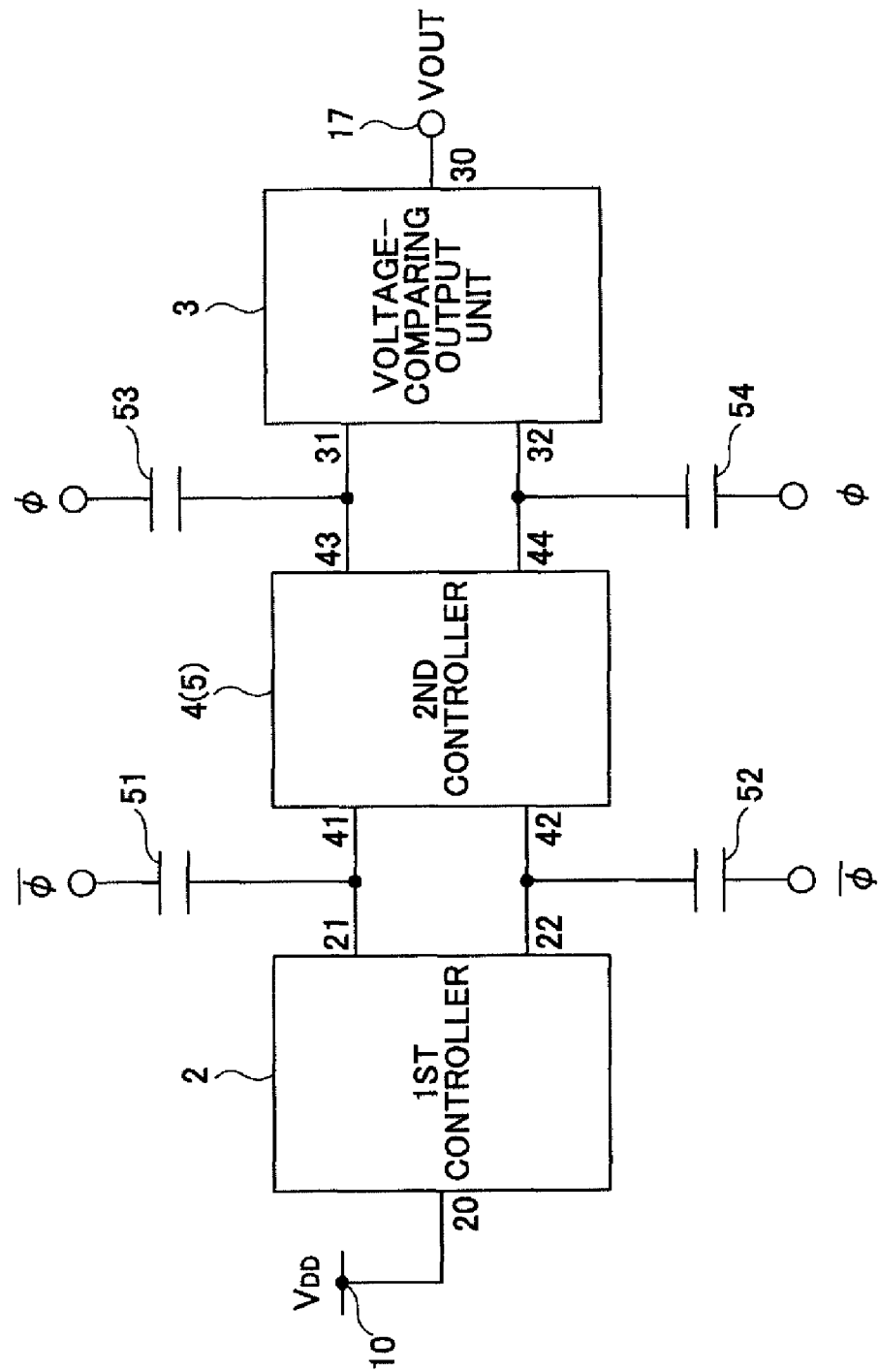
FIG. 9 shows a block diagram of a voltage generating circuit in which a charge pump circuit according to an embodiment of the present invention is used.
Figure 10:
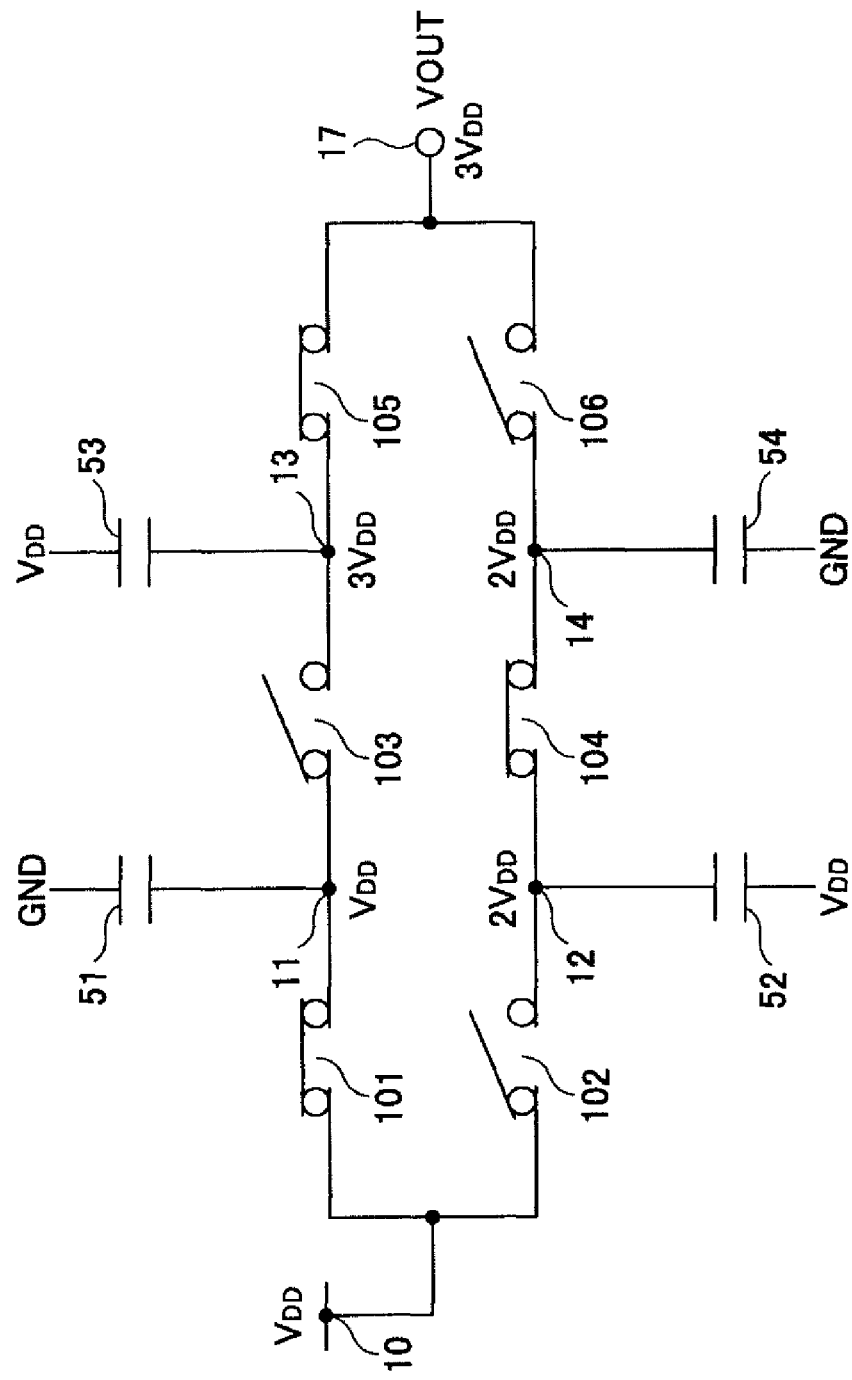
FIG. 10 shows a circuit diagram illustrating the principle of operation of the charge pump circuit according to the present embodiment.

FIG. 9 shows a block diagram of a voltage generating circuit using a 2-stage charge pump circuit according to an embodiment of the present invention. FIG. 10 shows a circuit diagram illustrating the principle of the charge pump circuit according to the present embodiment.

The 2-stage charge pump circuit includes a first control unit 2, a second control unit 4(5), and a voltage comparison output unit 3. A capacitor is connected to each of the nodes between those units.

Referring to the principle diagram shown in FIG. 10, the 2-stage complementary component according to the present embodiment includes a first charge transfer circuit and a second charge transfer circuit. The first charge transfer circuit includes plural CTS's 101, 103, and 105 connected in series between a power supply input node 10 and an output terminal node 17. Capacitors 51 and 53 are connected to nodes 11 and 13 between the CTS's 101, 103, and 105. The second charge transfer circuit includes CTS's 102, 104, and 106 connected in series. Capacitors 52 and 54 are connected to nodes 12 and 14 between the CTS's 102, 104, and 106.

The first and the second charge transfer circuits are operated with opposite clock signals.

In FIG. 10, when the capacitors 51 and 54 are fed with GND potential and the capacitors 52 and 53 with VDD potential, the CTS's 101, 104, and 105 turn on, while the CTS's 102, 103, and 106 turn off. The node 11 has VDD potential, the node 12 has 2×VDD potential, the node 13 has 3×VDD potential, the node 14 has 2×VDD potential, and the output terminal 15 has 3×VDD potential.

Each of the CTS's shown in FIG. 10 is realized with a single MOS transistor.

Referring to FIG. 9, a node 21 of the first control unit 2 on the side of the first charge transfer circuit is connected to a node 41 of the second control unit 4(5) on the side of the first charge transfer circuit. A node 22 of the first control unit 2 on the side of the second charge transfer circuit is connected to a node 42 of the second control unit 4(5) on the side of the second charge transfer circuit. A node 43 on an output side of the second control unit 4(5) is connected to a node 31 of the voltage comparison output unit 3 on the side of the first charge transfer circuit. A node 44 on the output side of the second control unit 4(5) on the second charge transfer circuit side is connected to a node 32 of the voltage comparison output unit 3 on the second charge transfer circuit side.

In the first charge transfer circuit, one end of the capacitor 51 is connected between the nodes 21 and 41. Between the nodes 43 and 31 is connected one end of the capacitor 53.

In the second charge transfer circuit, one end of the capacitor 52 is connected between the nodes 22 and 42. One end of the capacitor 54 is connected between the nodes 44 and 32. The other ends of the capacitors 52 and 54 are fed with complementary clocks so that the odd-numbered and even-numbered capacitors are driven with opposite phases. The first charge transfer circuit and the second charge transfer circuit are driven with opposite phases. The capacitors 51 to 54 are fed with complementary clocks φ and /φ.

The first control unit 2 includes charge transfer switches formed by MOS transistors for transferring charges from the power supply input node 10 to the first-stage capacitors 51 and 52.

The second control unit 4(5) includes CTS's formed by MOS transistors for transferring charges from a predetermined capacitor to the next-stage capacitor. The second control unit 4(5) also includes switches (hereafter referred to as "gate-controlling switches") for selectively feeding a signal from a previous-stage node or a later-stage node to the gate terminal of the CTS's, depending on the phase of the clock signal. The voltage comparison output unit 3 includes CTS's formed by MOS transistors for transferring charges from each of the capacitors in the final stage to the output node 17.

Referring to FIG. 10, the switches 101 and 102 correspond to the CTS's in the first control unit 2. The switches 103 and 104 correspond to the CTS's in the second control unit 4(5). The switches 105 and 106 correspond to the CTS's in the voltage comparison unit 3.

Figure 11:
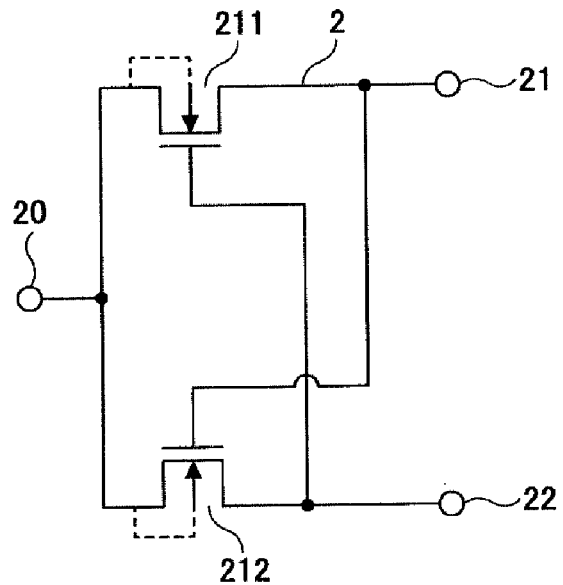
FIG. 11 shows a circuit diagram of a first control unit of the charge pump circuit of the present embodiment.

FIG. 11 shows a circuit diagram of the first control unit 2. The first control unit 2 includes a NMOS transistor 211 as a CTS (hereafter referred to as a "CTS NMOS transistor") on the first charge transfer circuit side and a CTS NMOS transistor 212 on the second charge transfer circuit side. The drain terminal of the CTS NMOS transistor 211 on the first charge transfer circuit side is connected to the first node 21 that is connected to the capacitor 51 for the first charge transfer circuit. The gate terminal is connected to the second node 22 that is connected to the capacitor 52 for the second charge transfer circuit. The source and the substrate terminals are connected to the power supply input node 20.

On the second charge transfer circuit side, the drain terminal of the CTS NMOS transistor 212 is connected to the second node 22, the gate terminal is connected to the first node 21, and the source terminal and the substrate terminal are connected to the power supply input node 20 that is connected to the power supply input terminal 10.

Figure 12:
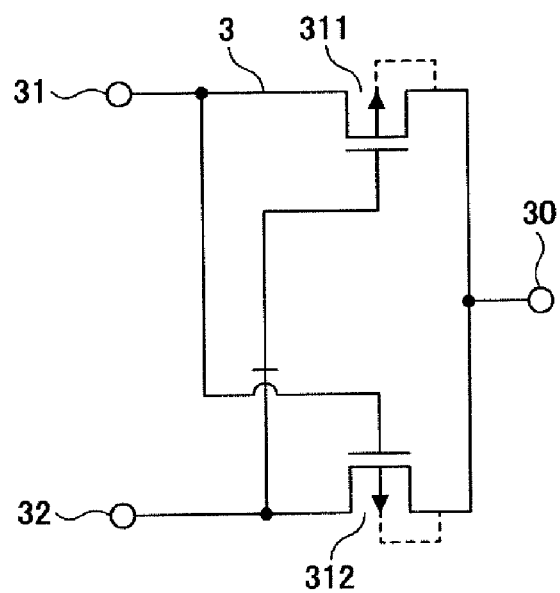
FIG. 12 shows a circuit diagram of a voltage comparison output unit of the charge pump circuit according to the present embodiment.

FIG. 12 shows a circuit diagram of the voltage comparison output unit 3. The voltage comparison output unit 3 includes a PMOS transistor 311 as a CTS (hereafter referred to as a "CTS PMOS transistor") on the first charge transfer circuit side and a CTS PMOS transistor 312 on the second charge transfer circuit side. The drain terminal of the CTS PMOS transistor 311 is connected to the node 31 that is connected to the capacitor 53 on the first charge transfer circuit side. The gate terminal of the CTS PMOS transistor 311 is connected to the node 32 that is connected to the capacitor 54 on the second charge transfer circuit side. The source of the CTS PMOS transistor 311 and the substrate terminal are connected to the output node 30.

On the second charge transfer circuit side, the drain terminal of the CTS PMOS transistor 312 is connected to the node 32, the gate terminal is connected to the node 31, and the source terminal and the substrate terminal are connected to the output node 30.

Referring back to FIG. 10, when the capacitors 51 and 54 are fed with GND potential and the capacitors 52 and 53 are fed with VDD potential, in a best operation status of the present circuit, the CTS's 101, 104, and 105 turn on, and the CTS's 102, 103, and 106 turn off; the node 11 has VDD potential, the node 12 has 2×VDD, the node 13 has 3×VDD, the node 14 has 2×VDD, and the output terminal 17 has 3×VDD.

Figure 13:
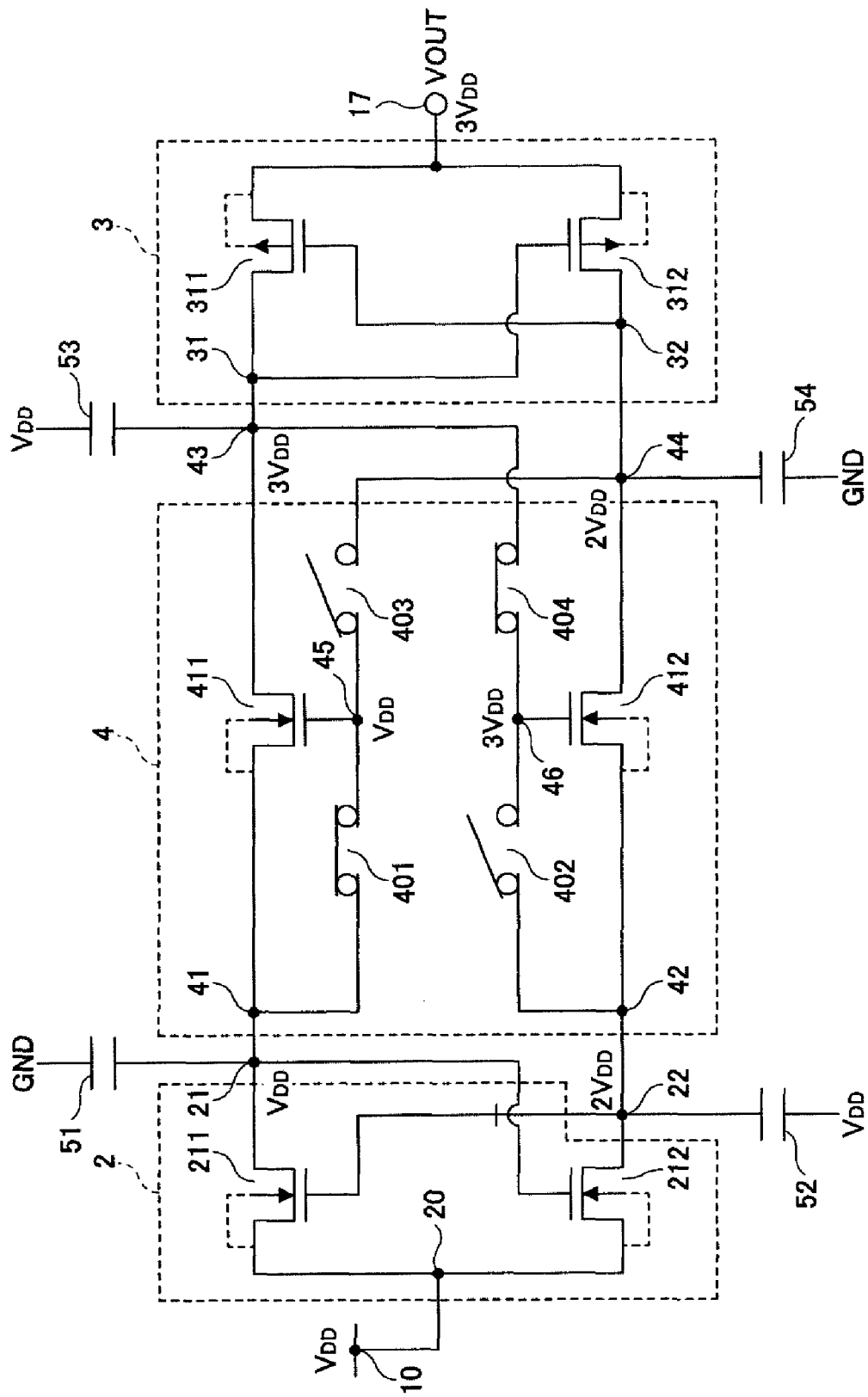
FIG. 13 shows a circuit diagram of an embodiment of the charge pump circuit in which NMOS transistors are used as charge transfer switches in the second control unit.
Figure 14:
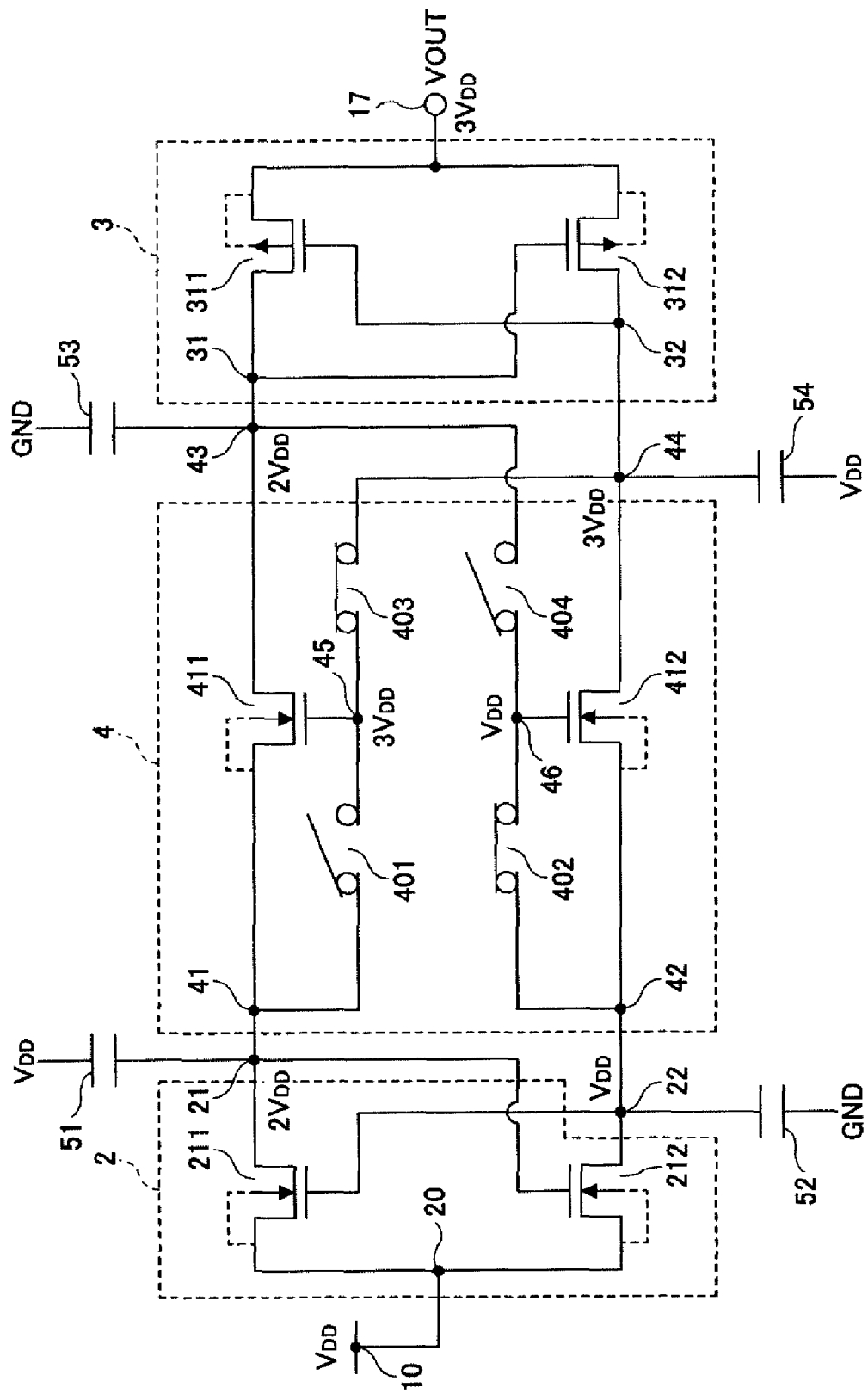
FIG. 14 shows another circuit diagram of the embodiment of FIG. 13.

FIGS. 13 and 14 shows an embodiment in which the first control unit 2 and the voltage comparison output unit 3 of FIGS. 11 and 12 are used, and in which the second control unit 4 employs NMOS transistors as CTS's. Specifically, NMOS transistors 411 and 412 are used as the CTS's 103 and 104 shown in FIG. 10. The N-type second control unit 4 also includes gate-control switches 401, 402, 403, and 404.

In the N-type second control unit 4, the switches 401 and 403 are connected in series on the first charge transfer circuit side. One end of the switch 401 is connected to the node 41 on the first charge transfer circuit side. The other end of the switch 401 is connected to one end of the switch 403. The other end of the switch 403 is connected to the node 44 on the output side of the second charge transfer circuit.

On the second charge transfer circuit side, the switches 402 and 404 are connected in series. One end of the switch 402 is connected to the node 42 on the second charge transfer circuit side. The other end of the switch 402 is connected to one end of the switch 404. The other end of the switch 404 is connected to the node 43 on the output side of the first charge transfer circuit.

In the first charge transfer circuit, the CTS NMOS transistor 411 has its gate terminal connected to a node 45 between the switches 401 and 403; its source terminal and the substrate terminal connected to the node 41 on the input side of the first charge transfer circuit to which charges from the previous-stage capacitor are transferred; and its drain terminal connected to the output side node 43 from which charges are transferred to the subsequent-stage capacitor in the first charge transfer circuit.

With regard to the CTS NMOS transistor 412 in the second charge transfer circuit, the gate terminal is connected to a node 46 between the switches 402 and 404; the source terminal and the substrate terminal are connected to the input-side node 42 of the second charge transfer circuit via which charges from the previous-stage capacitor are transferred; and the drain terminal is connected to the output side node 44 from which charges are transferred to the subsequent-stage capacitor in the second charge transfer circuit.

In the embodiment shown in FIG. 13, the capacitors 51 and 54 are fed with GND and the capacitors 52 and 53 are fed with VDD. The circuit is operated so that the CTS NMOS transistors 211 and 412 and the CTS PMOS transistor 311 turn on, while the CTS NMOS transistors 212 and 411 and the CTS PMOS transistor 312 turn off. The node 41 has VDD, the node 42 has 2×VDD, the node 43 has 3×VDD, the node 44 has 2×VDD, and the output terminal 17 has 3×VDD.

In the first control unit 2, the drain terminal of the CTS NMOS transistor 211 on the first charge transfer circuit side is connected to the first node 21 that is connected to the capacitor 51 for the first charge transfer circuit. The gate terminal of the CTS NMOS transistor 211 is connected to the second node 22 that is connected to the capacitor 52 for the second charge transfer circuit. The source terminal of the CTS NMOS transistor 211 and the substrate terminal are connected to the power supply input node 20.

Because the capacitor 52 is fed with the VDD potential, the node 22 has 2×VDD. Because the capacitor 51 is fed with the GND, the node 21 has VDD potential. Thus, the gate terminal of the CTS NMOS transistor 211 is fed with the 2×VDD potential, thereby turning on the CTS NMOS transistor 211.

On the second charge transfer circuit side, the drain terminal of the CTS NMOS transistor 212 is connected to the second node 22, the gate terminal is connected to the first node 21, and the source terminal and the substrate terminal are connected to the power supply input node 20. The drain terminal of the CTS NMOS transistor 212 is connected to the second node 22, the gate terminal is connected to the first node 21 that is connected to the capacitor 51 for the first transfer circuit. The source terminal and the substrate terminal are connected to the power supply input node 20. Thus, the gate terminal of the CTS NMOS transistor 212 is fed with the VDD potential, so that the CTS NMOS transistor 212 turn off.

In the second control unit 4, the gate terminal of the CTS NMOS transistor 411 in the first charge transfer circuit is connected to the node 45 between the switches 401 and 403; the source terminal and the substrate terminal are connected to the node 41 on the input side of the first charge transfer circuit to which charges from the capacitor 51 are transferred; the drain terminal is connected to the output side node 43 via which charges are transferred to the capacitor 53 in the subsequent stage of the first charge transfer circuit. Because the capacitor 53 is fed with the 3×VDD potential, the node 43 has the 3×VDD potential.

In the second charge transfer circuit, the gate terminal of the CTS NMOS transistor 412 is connected to the node 46 between the switches 402 and 404; the source terminal and the substrate terminal are connected to the input-side node 42 of the second charge transfer circuit to which a charge from the previous-stage capacitor 52 is transferred; and the drain terminal is connected to the output side node 44 via which charges are transferred to the capacitor 54 in the subsequent stage of the second charge transfer circuit. Because the capacitor 54 is fed with the GND potential, the node 44 has 2×VDD potential.

In order to turn off the CTS NMOS transistor 411, the gate terminal of the CTS NMOS transistor 411 needs to be fed with the VDD potential. When the switch 401 is fed with VDD and the switch 403 with 2×VDD, the CTS NMOS transistor 411 can be fed with the VDD via the switch 401 and turned off by turning on the switch 401 while turning off the switch 403.

With regard to the CTS NMOS transistor 412, the gate terminal is connected to the node 46 between the switches 402 and 404; the source terminal and the substrate terminal are connected to the input-side node 42 of the second charge transfer circuit to which charges from the previous-stage capacitor 52 are transferred; the drain terminal is connected to the output side node 44 via which charges are transferred to the capacitor 54 in the subsequent stage of the second charge transfer circuit.

In order to turn on the CTS NMOS transistor 412, its gate terminal needs to be fed with the 3×VDD potential. The switch 402 is fed with 2×VDD potential and the switch 404 with 3×VDD potential. Thus, the CTS NMOS transistor 412 can be fed with the 3×VDD potential via the switch 404 by turning off the switch 402 and turning on the switch 404.

In the voltage comparison output unit 3, the drain terminal of the CTS PMOS transistor 311 on the first charge transfer circuit side is connected to the node 31 that is connected to the capacitor 53 of the first charge transfer circuit; the gate terminal is connected to the node 32 that is connected to the capacitor 54 of the second charge transfer circuit; and the source and the substrate terminal are connected to the output node 30.

Thus, the node 31 is fed with 3×VDD potential, the node 32 has the 2×VDD potential, the gate terminal of the CTS PMOS transistor 311 is fed with the 2×VDD potential, and the gate terminal of the CTS PMOS transistor 312 is fed with 3×VDD potential. Thus, the CTS PMOS transistor 311 turns on while the CTS PMOS transistor 312 turns off.

FIG. 14 shows a state in which the drive signal has a phase opposite to that of the drive signal in the case of FIG. 13. In the example shown in FIG. 14, the capacitors 51 and 54 are fed with the VDD potential, and the capacitors 52 and 53 are fed with the GND potential. The circuit is operated so that the CTS NMOS transistors 211 and 412 and the CTS PMOS transistor 311 turn off while the CTS NMOS transistors 212 and 411 and the CTS PMOS transistor 312 turn on.

The node 41 has 2×VDD potential, the node 42 has VDD, the node 43 has 2×VDD, the node 44 has 3×VDD, and the output terminal 17 has 3×VDD potential.

In the first control unit 2, the node 21 has 2×VDD, and the node 22 has 2×VDD. Thus, the gate terminal of the CTS NMOS transistor 211 is fed with the VDD potential, so that the CTS NMOS transistor 211 turns off. The gate terminal of the CTS NMOS transistor 212 is fed with the 2×VDD potential, so that the CTS NMOS transistor 212 turns on.

In the second control unit 4, because the capacitor 53 is fed with the GND potential, the node 43 has the 2×VDD potential. Because the capacitor 54 is fed with the VDD potential, the node 44 has the 3×VDD potential.

In order to turn on the CTS NMOS transistor 411, the gate terminal of the CTS NMOS transistor 411 needs to be fed with the 3×VDD potential. The switch 401 is fed with the 2×VDD potential while the switch 403 is fed with the 3×VDD potential. Thus, by turning off the switch 401 and turning on the switch 404, the CTS NMOS transistor 411 can be fed with the 3×VDD potential via the switch 403, thereby turning on the CTS NMOS transistor 411.

In order to turn off the CTS NMOS transistor 412, the gate terminal of the CTS NMOS transistor 412 needs to be fed with the VDD potential. The switch 402 is fed with the VDD potential and the switch 404 is fed with the 3×VDD potential. Thus, by turning on the switch 402 while turning off the switch 404, the CTS NMOS transistor 412 can be fed with the VDD potential via the switch 402, thereby turning off the CTS NMOS transistor 412.

The switches 401, 402, 403, and 404 only need to perform a switch operation; thus, they may be smaller in size than the current transistors and do not require much area.

In this way, the ideal switching on/off-states shown in FIG. 10 can be achieved.

By realizing each of the switches required for charge transfer with a single transistor, Rch1 in the above expression (6) can be expressed as follows in the configuration of FIG. 13:

$$Rch1=R211+R411+R311 \quad (9)$$

and Rch2 can be expressed as follows:

$$Rch2=R212+R412+R312 \quad (10)$$

where R211 to R312 designate the drain-source resistance of each of the CTS MOS transistors 211 to 312 in the on-state.

In the circuit structure according to Non-Patent Document 1, 2N MOS transistors connected in series are required in the charge transfer path of the N-stage charge pump booster circuit. In contrast, the circuit structure according to the present embodiment requires only N+1 MOS transistors connected in series. Thus, the total drain-source resistance of the transistors in the charge transfer path can be reduced, thereby making the circuit suitable for heavy load.

With regard to the N-type second control unit 4, the gate-control switches 401, 403, 402, and 404 may be constructed of MOS transistors. Namely, as the switch units, an NMOS transistor and a PMOS transistor may be connected in series, wherein the node of the both transistors is fed to the gate terminal of an NMOS transistor as a charge transfer switch. Several configurations are possible using switches provided by NMOS transistors and PMOS transistors. With reference to FIGS. 15 to 18, some of the examples are described.

Figure 15:
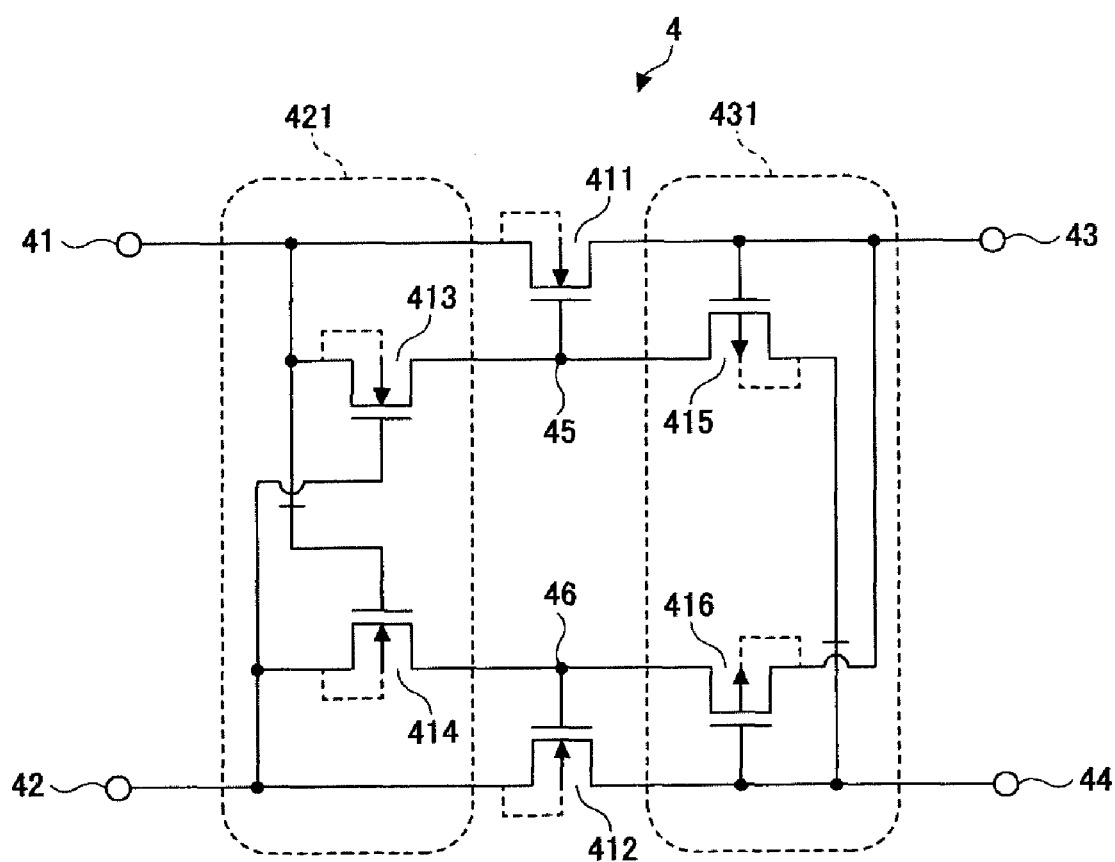
FIG. 15 shows a first example of an N-type second control unit in the charge pump circuit.

FIG. 15 shows a circuit diagram of a first example of the N-type second control unit 4. The N-type second control unit 4 shown in FIG. 15 includes a NMOS transistor 413 as a gate-control switch (hereafter referred to as a "SW NMOS transistor") and a PMOS transistor 415 as a gate-control switch ("SW PMOS transistor") connected in series, forming a first charge transfer circuit. A SW NMOS transistor 414 and a SW PMOS transistor 416 are also connected in series, in a second charge transfer circuit.

The NMOS transistors and the PMOS transistors as the gate-control switches only need to provide a switch operation. Thus, they can be realized with transistors that require less area than the current transistors.

The source terminal of the SW NMOS transistor 413 and the substrate terminal in the first charge transfer circuit are connected to the input-side node 41 of the first charge transfer circuit. The gate terminal is connected to the input-side node 42 of the second charge transfer circuit. The drain terminal is connected to the drain terminal of the SW PMOS transistor 415.

The source terminal of the SW PMOS transistor 415 and the substrate terminal in the first charge transfer circuit are connected to the output side node 44 of the second charge transfer circuit. The drain terminal is connected to the drain terminal of the SW NMOS transistor 413. The gate terminal is connected to the output side node 43 of the first charge transfer circuit.

The node 45 between the drain terminals of the SW NMOS transistor 413 and the SW PMOS transistor 415 is connected to the gate terminal of the CTS NMOS transistor 411 in the first transfer circuit.

The source terminal of the SW NMOS transistor 414 and the substrate terminal in the second charge transfer circuit are connected to the input-side node 42 of the second charge transfer circuit. The gate terminal is connected to the input-side node 41 of the first charge transfer circuit. The drain terminal is connected to the drain terminal of the SW PMOS transistor 416.

The source terminal of the SW PMOS transistor 416 and the substrate terminal in the second charge transfer circuit are connected to the output side node 43 of the first charge transfer circuit. The drain terminal is connected to the drain terminal of the SW NMOS transistor 414. The gate terminal is connected to the output side node 44 of the second charge transfer circuit.

The node 46 between the drain terminals of the SW NMOS transistor 414 and the SW PMOS transistor 416 is connected to the gate terminal of the CTS NMOS transistor 412 in the second transfer circuit.

Thus, in the first example of the N-type second control unit 4, a first NMOS transistor block 421 is formed by the SW NMOS transistors 413 and 414 connected as described above. A first PMOS transistor block 431 is formed by the SW PMOS transistors 415 and 416.

When the capacitors 51 and 54 are fed with GND potential and the capacitors 52 and 53 are fed with VDD as described with reference to FIG. 13, the first NMOS transistor block 421 and the first PMOS transistor block 431 of FIG. 15 operate as follows.

In the first NMOS transistor block 421, there is a potential difference of VDD between the nodes 42 and 41. When the potential difference is Vtn or above, the SW NMOS transistor 413 turns on. In this state, the SW NMOS transistor 414 turns off.

Similarly, in the first PMOS transistor block 431, there is a potential difference −VDD between the nodes 44 and 43. When the potential difference is −|Vtp| or above, the SW PMOS transistor 416 turns on. In this state, the SW PMOS transistor 415 turns off.

Because the SW NMOS transistor 413 turns on while the SW PMOS transistor 415 turns off, the node 45 has the potential VDD of the node 41. Because the SW NMOS transistor 414 turns off while the SW PMOS transistor 416 turns on, the node 46 has the potential 3×VDD of the node 43.

The potentials at the gate terminals thus controlled, the CTS NMOS transistor 411 turns off while the CTS NMOS transistor 412 turns on.

When the capacitors 51 and 54 are fed with VDD potential and the capacitors 52 and 53 are fed with GND as described with reference to FIG. 14, the first NMOS transistor block 421 and the first PMOS transistor block 431 operate as follows.

In the first NMOS transistor block 421, there is a potential difference −VDD between the nodes 42 and 41. When the potential difference is equal to Vtn or below, the SW NMOS transistor 413 turns off. In this state, the SW NMOS transistor 414 turns on.

Similarly, in the first PMOS transistor block 431, there is a potential difference VDD between the nodes 44 and 43. When the potential difference is equal to |Vtp| or above, the SW PMOS transistor 416 turns off, while the SW PMOS transistor 415 turns on.

Because the SW PMOS transistor 415 turns on while the SW NMOS transistor 413 turns off, the node 45 has the potential 3×VDD of the node 43. The node 46 has the potential VDD of the node 43 because the SW NMOS transistor 414 turns on while the SW PMOS transistor 416 turns off. The gate terminal potentials thus controlled, the CTS NMOS transistor 411 turns on while the CTS NMOS transistor 412 turns off.

Figure 16:
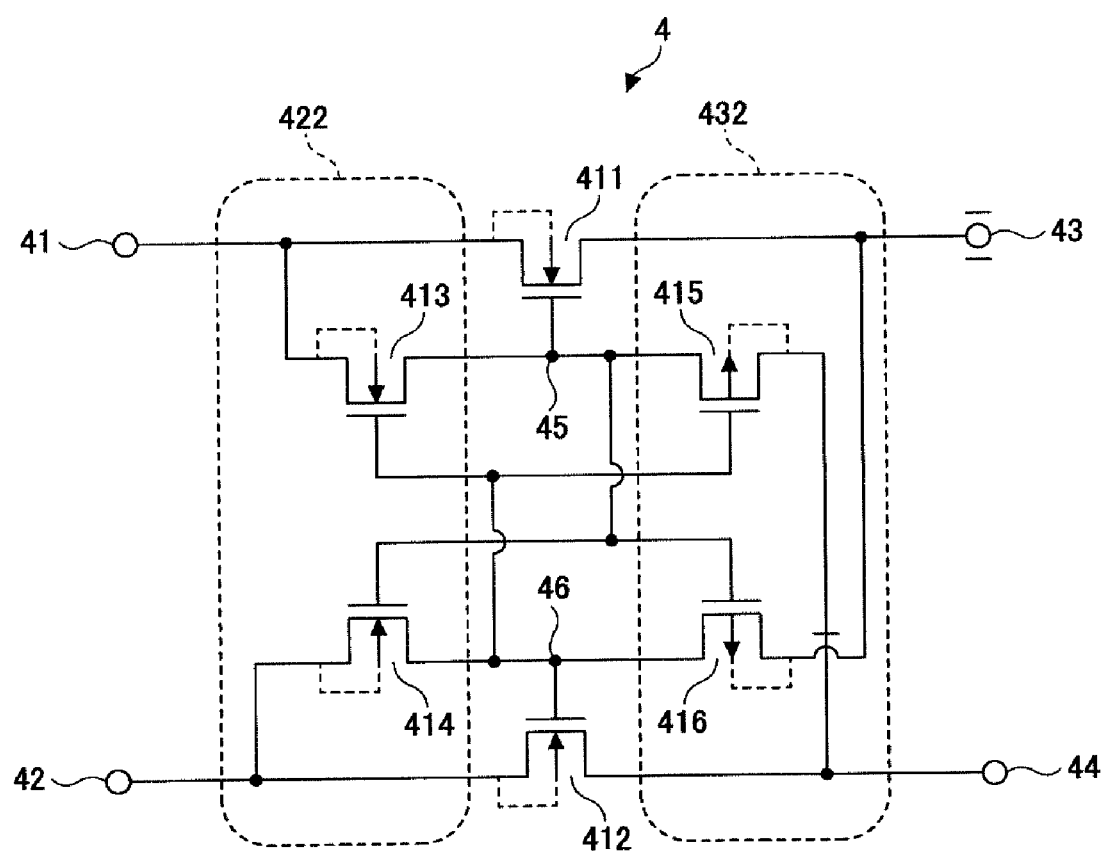
FIG. 16 shows a second example of the N-type second control unit.

FIG. 16 shows a circuit diagram of a second example of the N-type second control unit 4. The N-type second control unit 4 shown in FIG. 16 includes the SW NMOS transistor 413 and the SW PMOS transistor 415 connected in series in the first charge transfer circuit. The gate terminal of the SW NMOS transistor 413 and the gate terminal of the SW PMOS transistor 415 are connected. The SW NMOS transistor 414 and the SW PMOS transistor 416 are connected in series in the second charge transfer circuit. The gate terminal of the SW NMOS transistor 414 and the gate terminal of the SW PMOS transistor 416 are connected.

The source terminal of the SW NMOS transistor 413 and the substrate terminal in the first charge transfer circuit are connected to the first input-side node 41 of the first charge transfer circuit. The source terminal of the SW PMOS transistor 415 and the substrate terminal are connected to the output side node 44 of the second charge transfer circuit. The drain terminal of the SW NMOS transistor 413 is connected to the drain terminal of the SW PMOS transistor 415.

The gate terminal of the SW NMOS transistor 413 and that of the SW PMOS transistor 415 are connected to the connecting portion 46 between the drain terminals of the SW NMOS transistor 414 and the SW PMOS transistor 416 in the second charge transfer circuit.

The node 45 between the drain terminals of the SW NMOS transistor 413 and the SW PMOS transistor 415 is connected to the gate terminal of the CTS NMOS transistor 411 in the first transfer circuit.

In the second charge transfer circuit, the source terminal of the SW NMOS transistor 414 and the substrate terminal are connected to the input-side node 42 of the second charge transfer circuit. The source terminal of the SW PMOS transistor 415 and the substrate terminal are connected to the output side node 43 of the first charge transfer circuit. The drain terminal of the SW NMOS transistor 414 and the drain terminal of the SW PMOS transistor 416 are connected. The gate terminals of the SW NMOS transistor 414 and the SW PMOS transistor 416 are connected to the connecting portion 45 between the drain terminal of the SW NMOS transistor 413 and the SW PMOS transistor 415 in the first charge transfer circuit.

The node 46 between the drain terminals of the SW NMOS transistor 414 and the SW PMOS transistor 416 is connected to the gate terminal of the CTS NMOS transistor 412 in the second transfer circuit.

Thus, the second NMOS transistor block 422 and the second PMOS transistor block 432 are configured to supply potentials to the gate terminals of the CTS's.

When the capacitors 51 and 54 shown in FIG. 13 are fed with GND and the capacitors 52 and 53 with VDD, the second NMOS transistor block 422 and the second PMOS transistor block 432 shown in FIG. 16 operate as follows.

The node 45 has a potential that is equal to or greater than VDD and equal to or smaller than 2×VDD because the source potential of the SW NMOS transistor 413 is VDD and the source potential of the SW PMOS transistor 415 is 2×VDD. Further, the potential of the node 46 is equal to or greater than 2×VDD and equal to or smaller than 3×VDD because the source potential of the SW NMOS transistor 414 is 2×VDD and the source potential of the SW PMOS transistor 416 is 3×VDD.

Due to the above potential relationships, the SW NMOS transistor 413 turns on while the SW PMOS transistor 415 turns off. Thus, the potential of the node 45 becomes equal to VDD. Because the SW NMOS transistor 414 turns off and the SW PMOS transistor 416 turns on, the potential of the node 46 becomes equal to 3×VDD.

When the capacitors 51 and 54 are fed with VDD and the capacitors 52 and 53 with GND as shown in FIG. 14, the second NMOS transistor block 422 and the second PMOS transistor block 432 of FIG. 16 operate as follows.

The potential of the node 45 is equal to or greater than 2×VDD and equal to or smaller than 3×VDD because the source potential of the SW NMOS transistor 413 is 2×VDD and the source potential of the SW PMOS transistor 415 is 3×VDD. Further, the potential of the node 46 is equal to or greater than VDD and equal to or smaller than 2×VDD because the source potential of the SW NMOS transistor 414 is VDD and the source potential of the SW PMOS transistor 416 is 2×VDD.

Due to the above potential relationships, the SW NMOS transistor 413 turns off while the SW PMOS transistor 415 turns on. As a result, the potential of the node 45 becomes equal to 3×VDD. Because the SW NMOS transistor 414 turns on and the SW PMOS transistor 416 turns off, the potential of the node 46 becomes equal to VDD.

The first and second NMOS transistor blocks 421 and 422 and the first and second PMOS transistor blocks 431 and 432 according to the first and second examples of the second control unit shown in FIGS. 15 and 16 may be used in combinations. Examples of such combinations are described with reference to FIGS. 17 and 18 as a third example and a fourth example.

Figure 17:
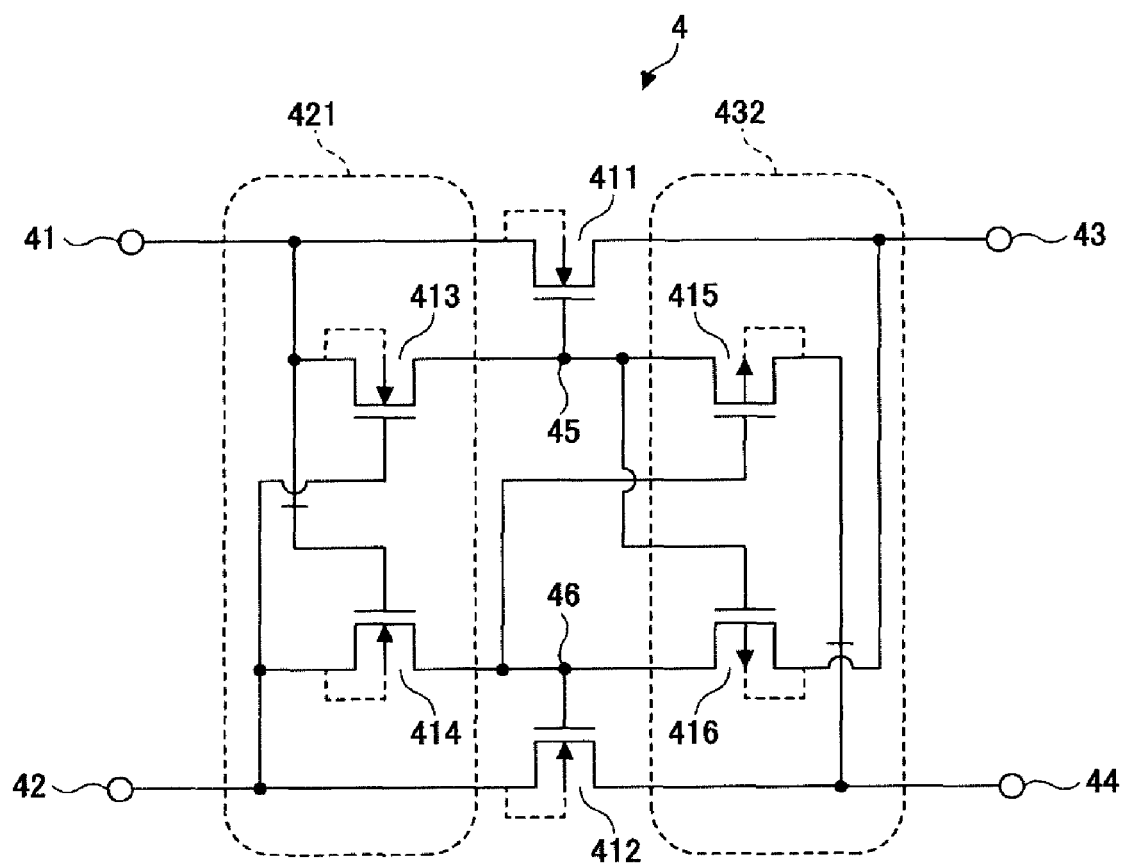
FIG. 17 shows a third example of the N-type second control unit.

FIG. 17 shows a circuit diagram of the third example of the N-type second control unit 4, in which the first NMOS transistor block 421 and the second PMOS transistor block 432 are used in combination.

As the gate-controlling switches used in the first charge transfer circuit, the SW NMOS transistor 413 and the SW PMOS transistor 415 are connected in series. As the switches used in the second charge transfer circuit, the SW NMOS transistor 414 and the SW PMOS transistor 416 are connected in series.

In the third example of the N-type second control unit 4 in FIG. 17, the source terminal of the SW NMOS transistor 413 in the first charge transfer circuit and the substrate terminal are connected to the input-side node 41 of the first charge transfer circuit; the gate terminal is connected to the input-side node 42 of the second charge transfer circuit; and the drain terminal is connected to the drain terminal of the SW PMOS transistor 415.

The source terminal of the SW PMOS transistor 415 and the substrate terminal in the first charge transfer circuit are connected to the output side node 44 of the second charge transfer circuit; and the gate terminal is connected to the node 46 of the second charge transfer circuit.

The source terminal of the SW NMOS transistor 414 and the substrate terminal in the second charge transfer circuit are connected to the input-side node 42 of the second charge transfer circuit; the gate terminal is connected to the input-side node 41 of the first charge transfer circuit; and the drain terminal is connected to the drain terminal of the SW PMOS transistor 416.

The source terminal of the SW PMOS transistor 416 and the substrate terminal in the second charge transfer circuit are connected to the output side node 43 of the first charge transfer circuit; the gate terminal is connected to the node 45 of the first charge transfer circuit.

In the N-type second control unit 4 shown in FIG. 17, too, the ideal on/off-states can be achieved as in the foregoing examples.

Figure 18:
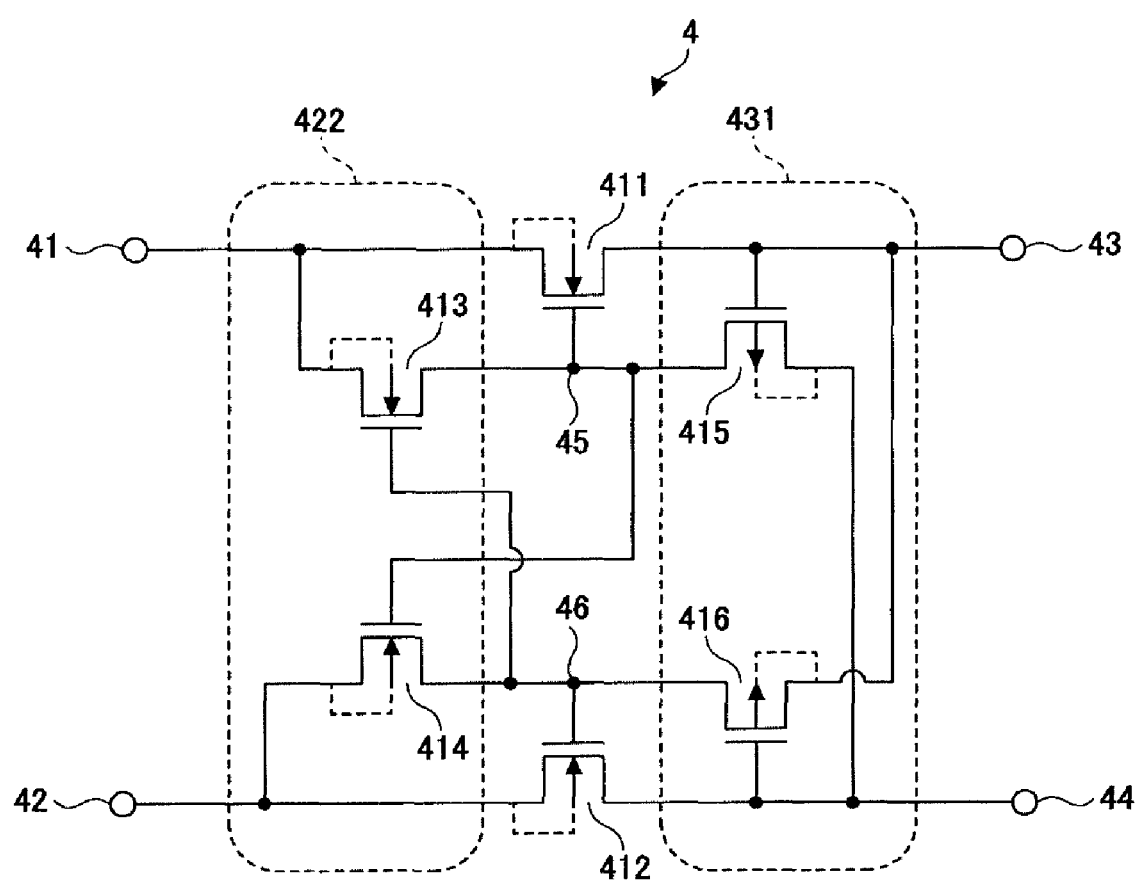
FIG. 18 shows a fourth example of the N-type second control unit.

FIG. 18 shows a circuit diagram of the fourth example of the N-type second control unit 4, in which the second NMOS transistor block 422 and the first PMOS transistor block 431 are used in combination.

As the gate-control switches used in the first charge transfer circuit, the SW NMOS transistor 413 and the SW PMOS transistor 415 are connected in series. As the gate-control switches used in the second charge transfer circuit, the SW NMOS transistor 414 and the SW PMOS transistor 416 are connected in series.

In the fourth example of the N-type second control unit 4, the source terminal of the SW NMOS transistor 413 and the substrate terminal in the first charge transfer circuit are connected to the input-side node 41 of the first charge transfer circuit; the gate terminal is connected to the node 46 of the second charge transfer circuit; and the drain terminal is connected to the drain terminal of the SW PMOS transistor 415.

The source terminal of the SW PMOS transistor 415 and the substrate terminal in the first charge transfer circuit are connected to the output side node 44 of the second charge transfer circuit; the gate terminal is connected to the output side node 43 of the first charge transfer circuit.

The source terminal of the SW NMOS transistor 414 and the substrate terminal in the second charge transfer circuit are connected to the input-side node 42 of the second charge transfer circuit; the gate terminal is connected to the node 45 of the first charge transfer circuit; and the drain terminal is connected to the drain terminal of the SW PMOS transistor 416.

The source terminal of the SW PMOS transistor 416 and the substrate terminal of the second charge transfer circuit are connected to the output side node 43 of the first charge transfer circuit; the gate terminal is connected to the output side node 44 of the second charge transfer circuit.

In the N-type second control unit 4 shown in FIG. 18, too, the ideal on/off-states can be achieved as in the earlier examples.

Figure 19:
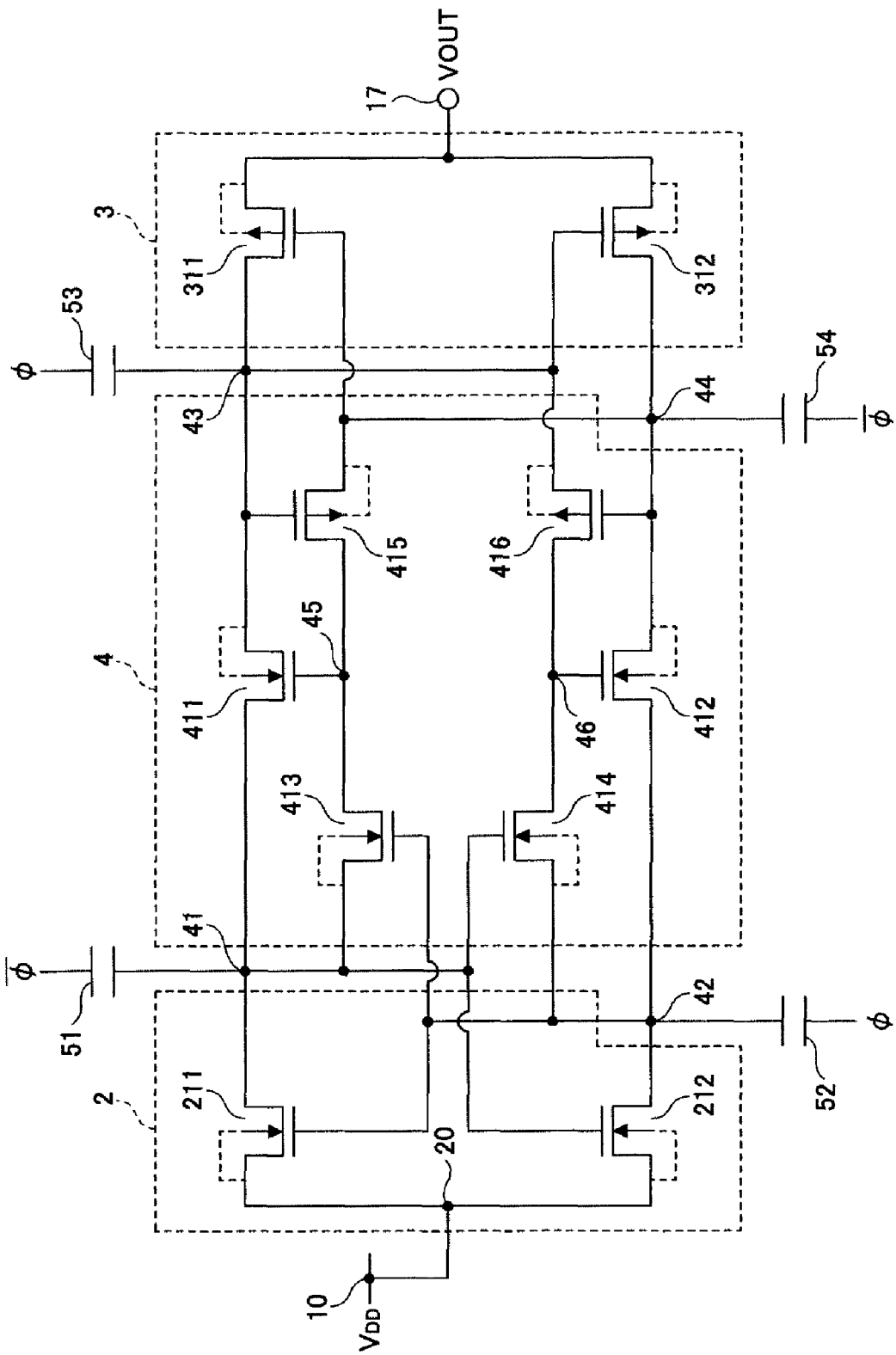
FIG. 19 shows a circuit diagram of an embodiment of the charge pump circuit in which NMOS transistors are used as the charge transfer switches in the second control unit.

FIG. 19 shows a circuit diagram of another example of the 2-stage charge pump shown in FIG. 9 that employs the first control unit shown FIG. 11, the second control unit shown in FIG. 15, and the voltage comparison unit shown in FIG. 12.

In the circuit shown in FIG. 19, when the clock signal φ is VDD, the potential of the second node 42 increases to 2×VDD, whereby the CTS NMOS transistor 211 turns on. As a result, the potential of the node 41 on the first charge transfer circuit side becomes equal to the potential VDD of the power supply input 10.

Because the potential of the node 41 is VDD and the potential of the node 42 on the second charge transfer circuit side is 2×VDD, the SW NMOS transistor 413 turns on. As a result, the potential of the node 45 in the first charge transfer circuit is lowered close to the potential of the first node 41. Accordingly, the CTS NMOS transistor 411 becomes close to the off-state.

Due to the potential of the node 41 and the potential of the node 42, the SW NMOS transistor 414 turns off. As a result, the potential of the node 46 on the second charge transfer circuit side is cut off from the potential of the node 42, and becomes higher. Accordingly, the SW NMOS transistor 414 approaches the on-state.

Because the CTS NMOS transistor 411 is close to the off-state and the capacitive element 53 is fed with the VDD potential, the potential 3×VDD is obtained at the node 43 on the output side of the first charge transfer circuit. Further, because the CTS NMOS transistor 412 is close to the on-state, the potential of the node 44 of the output side of the second charge transfer circuit becomes equal to the potential 2×VDD of the node 42.

Because the potential of the node 43 is 3×VDD and the potential of the node 44 is 2×VDD, the SW PMOS transistor 415 turns off and the SW NMOS transistor 413 turns on. Thus, the potential of the node 45 is fixed to the potential VDD of the node 41 on the input side, so that the CTS NMOS transistor 411 is reliably turned off. Further, in view of the fact that the SW PMOS transistor 416 turns on and the SW NMOS transistor 414 turns off, the potential of the node 46 is fixed to the potential 3×VDD of the node 43 on the output side, so that the CTS NMOS transistor 412 can be reliably turned on.

Due to the potential of the node 43 and that of the node 44, the CTS PMOS transistor 311 turns on, whereby the potential 3×VDD of the node 43 on the output side is outputted to the output terminal 17. In this case, the CTS PMOS transistor 312 turns off, and the potential 2×VDD of the node 44 on the output side is cut off from the output terminal 17.

Because the circuit according to the present embodiment has the two lines of the charge transfer circuits that are symmetrically configured, a boosting operation can be performed even when the clock signal φ is GND, by closing or opening the corresponding SW transistors as described above.

The present embodiment may employ any of the configurations of the N-type second control unit 4 shown in FIGS. 15 through 18 to perform the boosting operation.

Figure 20:
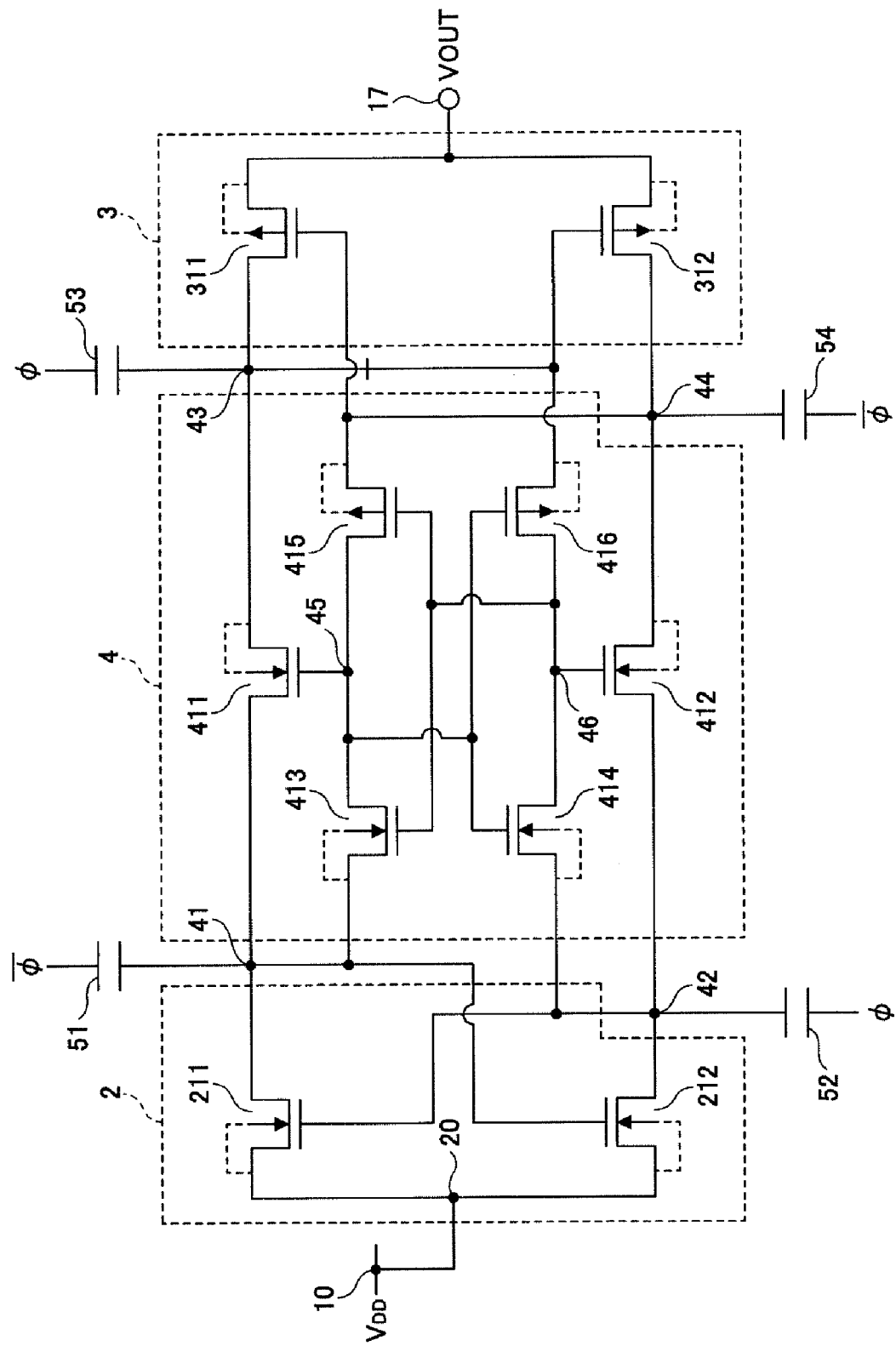
FIG. 20 shows a circuit diagram of another example of the charge pump circuit in which NMOS transistors are used as the charge transfer switches in the second control unit.

FIG. 20 shows a circuit diagram of another example of the 2-stage charge pump shown in FIG. 9 that employs the first control unit shown in FIG. 11, the second control unit shown in FIG. 16, and the voltage comparison unit shown in FIG. 12.

In this embodiment, too, as described above, the ideal on/off-states can be achieved in the NMOS transistors 211, 212, 411, and 412 and the PMOS transistor 311 and 312 as the charge transfer switches. Thus, by closing or opening the corresponding SW transistors, a boosting operation can be performed.

Figure 21:
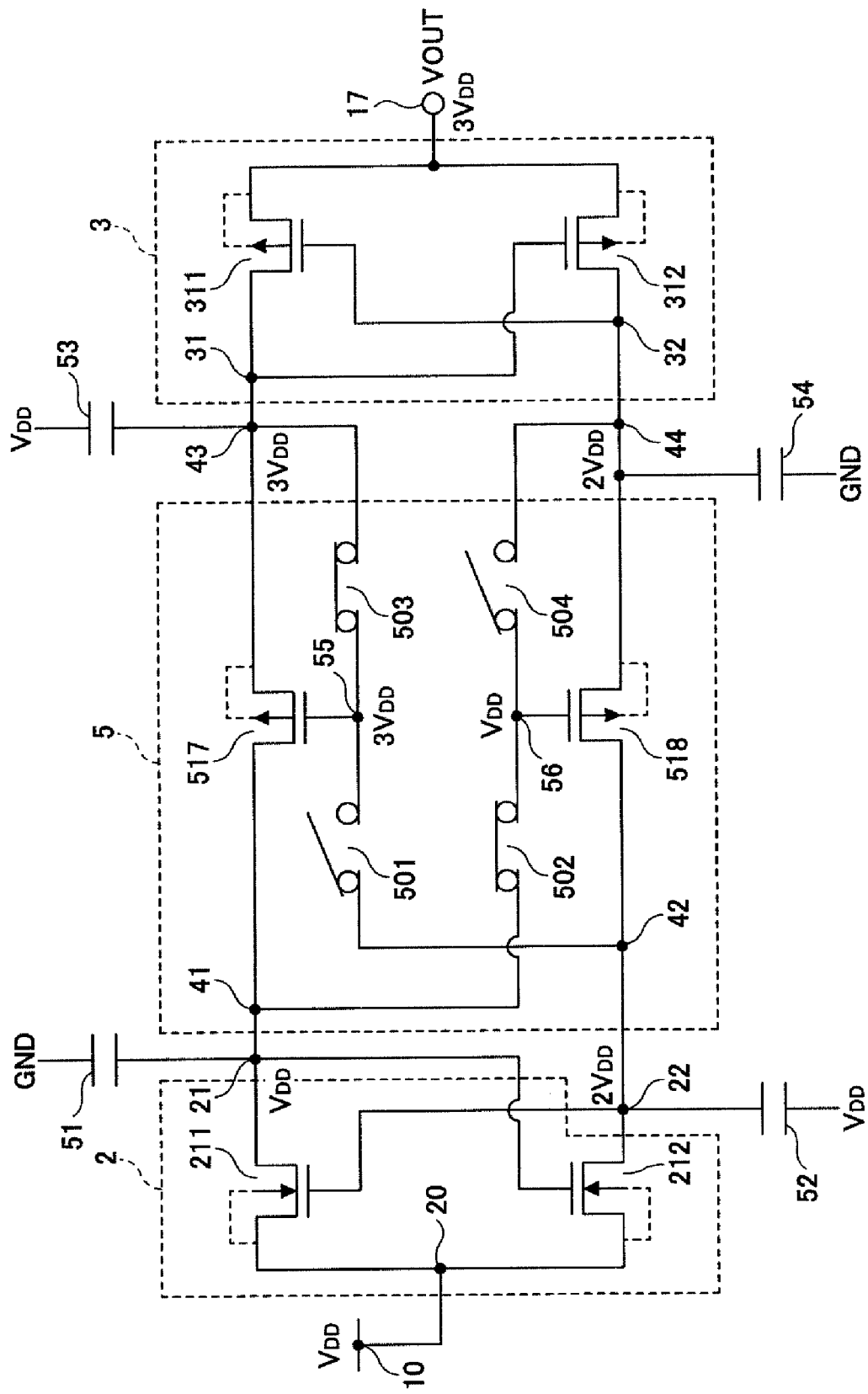
FIG. 21 shows a circuit diagram of another embodiment of the charge pump circuit in which PMOS transistors are used as the charge transfer switches in the second control unit.
Figure 22:
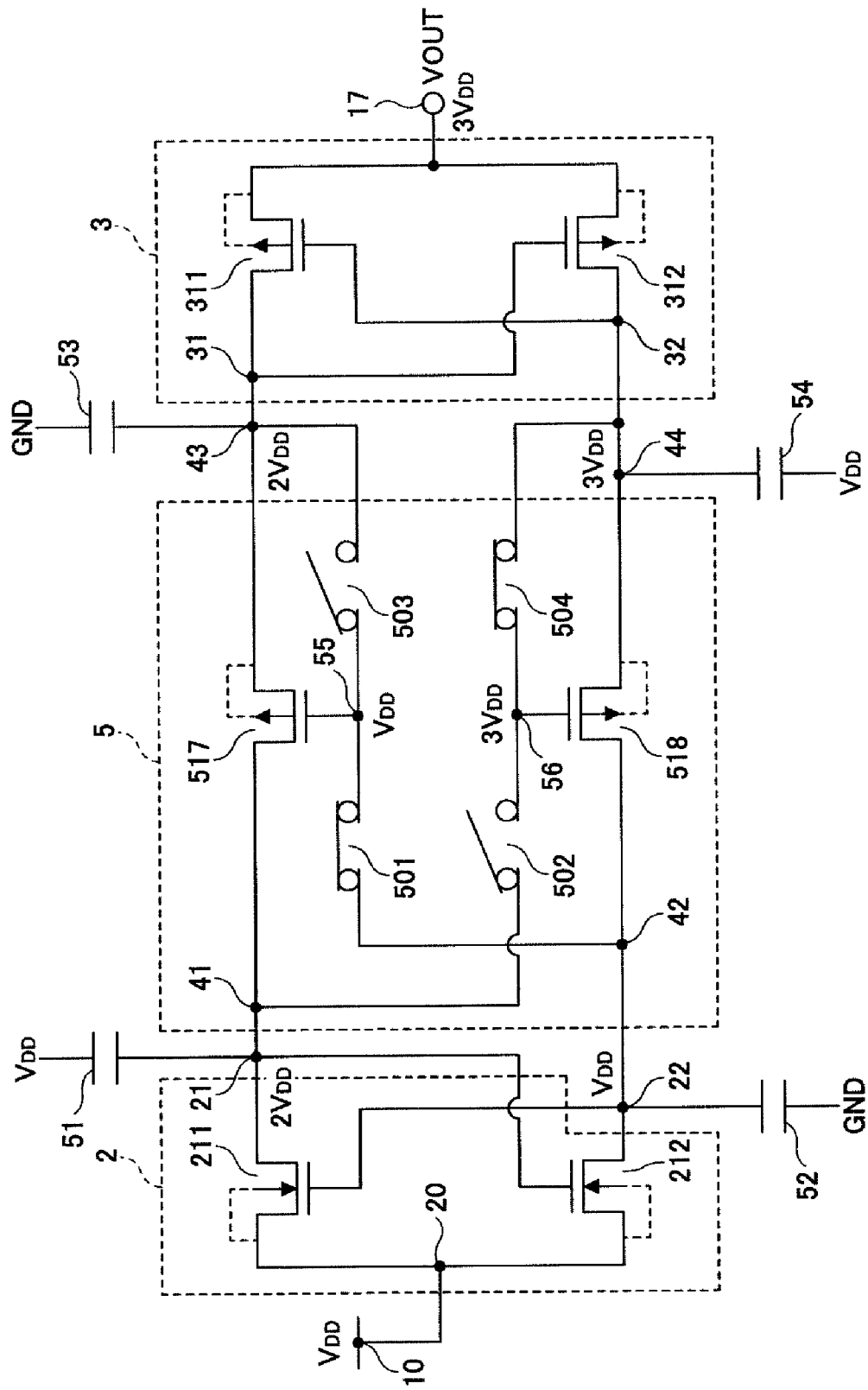
FIG. 22 shows a circuit diagram of another embodiment of the charge pump circuit in which PMOS transistors are used as the charge transfer switches in the second control unit.

FIGS. 21 and 22 show an embodiment that employs the first control unit 2 shown in FIG. 11 and the voltage comparison output unit 3 shown in FIG. 12. In this embodiment, PMOS transistors are used as the charge transfer switches in the second control unit. Specifically, in the embodiment shown in FIGS. 21 and 22, the CTS switches 103 and 104 shown in FIG. 10 are provided by a P-type second control unit 5 in which PMOS transistors 517 and 518 are used as CTS's and switches 501, 502, 503, and 504 are used as the gate-control switches.

In the P-type second control unit 5, the switches 501 and 503 are connected in series on the first charge transfer circuit side. One end of the switch 501 is connected to the node 41 on the first charge transfer circuit side; the other end is connected to one end of the switch 503. The other end of the switch 503 is connected the node 43 on the output side of the first charge transfer circuit.

The switches 502 and 504 are connected in series on the second charge transfer circuit side. One end of the switch 502 is connected to the node 42 on the second charge transfer circuit side; the other end is connected to one end of the switch 504. The other end of the switch 504 is connected to the node 44 on the output side of the second charge transfer circuit.

With regard to the CTS PMOS transistor 517 in the first charge transfer circuit, the gate terminal is connected to the node 55 between the switches 501 and 503; the source terminal and the substrate terminal are connected to the node 43 on the output side of the first charge transfer circuit from which charges are transferred to the subsequent-stage capacitor 53; and the drain terminal is connected to the input-side node 41 to which charges are transferred from the capacitor 51 in the previous stage of the first charge transfer circuit.

With regard to the P-type CTS MOS transistor 518 in the second charge transfer circuit, the gate terminal is connected to the node 56 between the switches 502 and 504; the source terminal and the substrate terminal are connected to the output side node 44 of the second charge transfer circuit from which charges are transferred to the capacitor 54 in the subsequent stage; and the drain terminal is connected to the input-side node 42 to which charges are transferred from the capacitor 52 in the previous stage of the second charge transfer circuit.

Referring to FIG. 21, the capacitors 51 and 54 are fed with GND and the capacitors 52 and 53 with VDD. This circuit is operated so that the CTS NMOS transistor 211, the CTS PMOS transistor 518, and the CTS PMOS transistor 311 turn on, while the CTS NMOS transistor 212, the CTS PMOS transistor 517, and the CTS PMOS transistor 312 turn off. The potential of the node 41 is VDD, the potential of the node 42 is 2×VDD, the potential of the node 43 is 3×VDD, the potential of the node 44 is 2×VDD, and the potential of the output terminal 17 is 3×VDD.

In the first control unit 2, the drain terminal of the CTS NMOS transistor 211 on the first charge transfer circuit side is connected to the first node 21 that is connected to the capacitor 51 of the first charge transfer circuit; the gate terminal is connected to the second node 22 that is connected to the capacitor 52 of the second charge transfer circuit; and the source terminal and the substrate terminal are connected to the power supply input node 20.

Because the capacitor 52 is fed with VDD, the node 22 has 2×VDD potential. Because the capacitor 51 is fed with the GND potential, the node 21 has VDD potential. Thus, the gate terminal of the CTS NMOS transistor 211 is fed with the 2×VDD potential, so that the CTS NMOS transistor 211 turns on.

With regard to the CTS NMOS transistor 212 on the second charge transfer circuit side, the drain terminal is connected to the second node 22, the gate terminal is connected to the first node 21, and the source terminal and the substrate terminal are connected to the power supply input node 20. Thus, the gate terminal of the CTS NMOS transistor 212 is fed with the VDD potential, so that the CTS NMOS transistor 212 turns off.

In the P-type second control unit 5, the CTS PMOS transistor 517 in the first charge transfer circuit has the gate terminal connected to the node 55 between the switches 501 and 503; the source terminal and the substrate terminal connected to the output side node 43 from which charges are transferred to the capacitor 53 in the subsequent stage of the first charge transfer circuit; and the drain terminal connected to the node 41 on the input side of the first charge transfer circuit from which charges are transferred from the capacitor 51. Because the capacitor 53 is fed with the 3×VDD potential, the node 43 has the 3×VDD potential.

With regard to the CTS PMOS transistor 518 in the second charge transfer circuit, the gate terminal is connected to the node 56 between the switches 502 and 504; the source terminal and the substrate terminal are connected to the output side node 44 from which charges are transferred to the capacitor 54 in the subsequent stage of the second charge transfer circuit; and the drain terminal is connected to the input-side node 42 of the second charge transfer circuit via which charges are transferred from the capacitor 52 in the previous stage. Because the capacitor 54 is fed with the GND potential, the node 44 has the 2×VDD potential.

In order to turn off the CTS PMOS transistor 517, its gate terminal needs to be fed with the 3×VDD potential. The switch 501 is fed with the 2×VDD potential, while the switch 503 is fed with the 3×VDD potential. Thus, by turning off the switch 501 while turning on the switch 503, the CTS PMOS transistor 517 can be fed with the 3×VDD potential via the switch 503, so that the CTS PMOS transistor 517 can be turned off.

With regard to the CTS PMOS transistor 518, the gate terminal is connected to the node 56 between the switches 502 and 504; the source terminal and the substrate terminal are connected to the output side node 44 via which charges are transferred to the capacitor 54 in the subsequent stage of the second charge transfer circuit; and the drain terminal is connected to the input-side node 42 of the second charge transfer circuit via which charges are transferred from the capacitor 52 in the previous stage.

In order to turn on the CTS PMOS transistor 518, the gate terminal of the CTS PMOS transistor 518 needs to be fed with the VDD potential. The switch 502 is fed with the VDD potential and the switch 404 is fed with the 2×VDD potential. Thus, by turning on the switch 502 and turning off the switch 504, the CTS PMOS transistor 518 can be fed with the VDD potential via the switch 502, so that the CTS PMOS transistor 518 can be turned on.

In the voltage comparison output unit 3, the drain terminal of the CTS PMOS transistor 311 on the first charge transfer circuit side is connected to the node 31 connected to the capacitor 53 of the first charge transfer circuit; the gate terminal is connected to the node 32 connected to the capacitor 54 of the second charge transfer circuit; and the source and the substrate terminal are connected to the output node 30. The node 31 has 3×VDD; the node 32 has 2×VDD; the gate terminal of the CTS PMOS transistor 311 is fed with 2×VDD; and the gate terminal of the CTS PMOS transistor 312 is fed with 3×VDD. Thus, the CTS PMOS transistor 311 turns on while the CTS PMOS transistor 312 turns off.

FIG. 22 shows a state in which the phase of the drive signal is reversed from that in FIG. 21. The capacitors 51 and 54 are fed with VDD and the capacitors 52 and 53 are fed with GND. This circuit is operated so that the CTS NMOS transistor 211, the CTS PMOS transistor 518, and the CTS PMOS transistor 311 turn off while the CTS NMOS transistor 212, CTS PMOS transistor 517, and the CTS PMOS transistor 312 turn on. Thus, the node 41 has 2×VDD, the node 42 has VDD, the node 43 has 2×VDD, the node 44 has 3×VDD, and the output terminal 17 has 3×VDD.

In the first control unit 2, the node 21 has 2×VDD and the node 22 has VDD. Thus, the gate terminal of the CTS NMOS transistor 211 is fed with the VDD potential, whereby the CTS NMOS transistor 211 turns off. The gate terminal of the CTS NMOS transistor 212 is fed with the 2×VDD potential, whereby the CTS NMOS transistor 212 turns on.

In the second control unit 5, the capacitor 53 is fed with GND. Thus, the node 43 has 2×VDD. Because the capacitor 54 is fed with VDD, the node 44 has 3×VDD.

In order to turn on the CTS PMOS transistor 517, its gate terminal needs to be fed with the VDD potential. The switch 501 is fed with the VDD potential and the switch 503 is fed with the 2×VDD potential. Thus, by turning on the switch 501 while turning off the switch 503, the CTS PMOS transistor 517 can be fed with the VDD potential via the switch 501, so that the CTS PMOS transistor 517 can be turned on.

In order to turn off the CTS PMOS transistor 518, its gate terminal needs to be fed with the 3×VDD potential. The switch 502 is fed with the 2×VDD potential and the switch 504 is fed with the 3×VDD potential. Thus, by turning off the switch 502 while turning on the switch 504, the CTS PMOS transistor 518 can be fed with the 3×VDD potential via the switch 504, so that the CTS PMOS transistor 518 can be turned off.

The gate-control switches 501, 502, 503, and 504 are only needed to perform a switch operation. Thus, these switches may be smaller in size than the current transistors, thus requiring not much area.

In this way, the ideal switch on/off-states shown in FIG. 10 can be achieved.

In the above configuration, by realizing each of the switches required for charge transfer with a single transistor, Rch1 in the aforementioned expression (6) can be expressed as follows in the case of FIG. 21:

$$Rch1=R211+R517+R311 \quad (11)$$

and Rch2 can be expressed as follows:

$$Rch2=R212+R518+R312 \quad (12)$$

where R211, R212, R311, R312, R517, and R518 are the drain-source resistance of the MOS transistors 211, 212, 311, 312, 517, and 518, respectively, in the on-state.

In the circuit structure according to the aforementioned Non-Patent Document 1, 2N MOS transistors connected in series are required in the charge transfer path in the case of an N-stage charge pump booster circuit. In contrast, in the circuit structure according to the present embodiment, only N+1 MOS transistors are required to be connected in series. Thus, the total drain-source resistance of the transistors in the charge transfer path can be reduced, so that the circuit can handle a heavy load.

With regard to the P-type second control unit 5, the gate-control switches 501, 503, 502, and 504 can be constructed of MOS transistors. Specifically, an NMOS transistor and a PMOS transistor as the gate-control switch units may be connected in series, and the node between the both transistors can be fed to the gate terminal of the PMOS transistor as a charge transfer switch. Several examples using switch units formed by NMOS and PMOS transistors may be provided. With reference to FIGS. 23 through 26, some of the examples are described.

Figure 23:
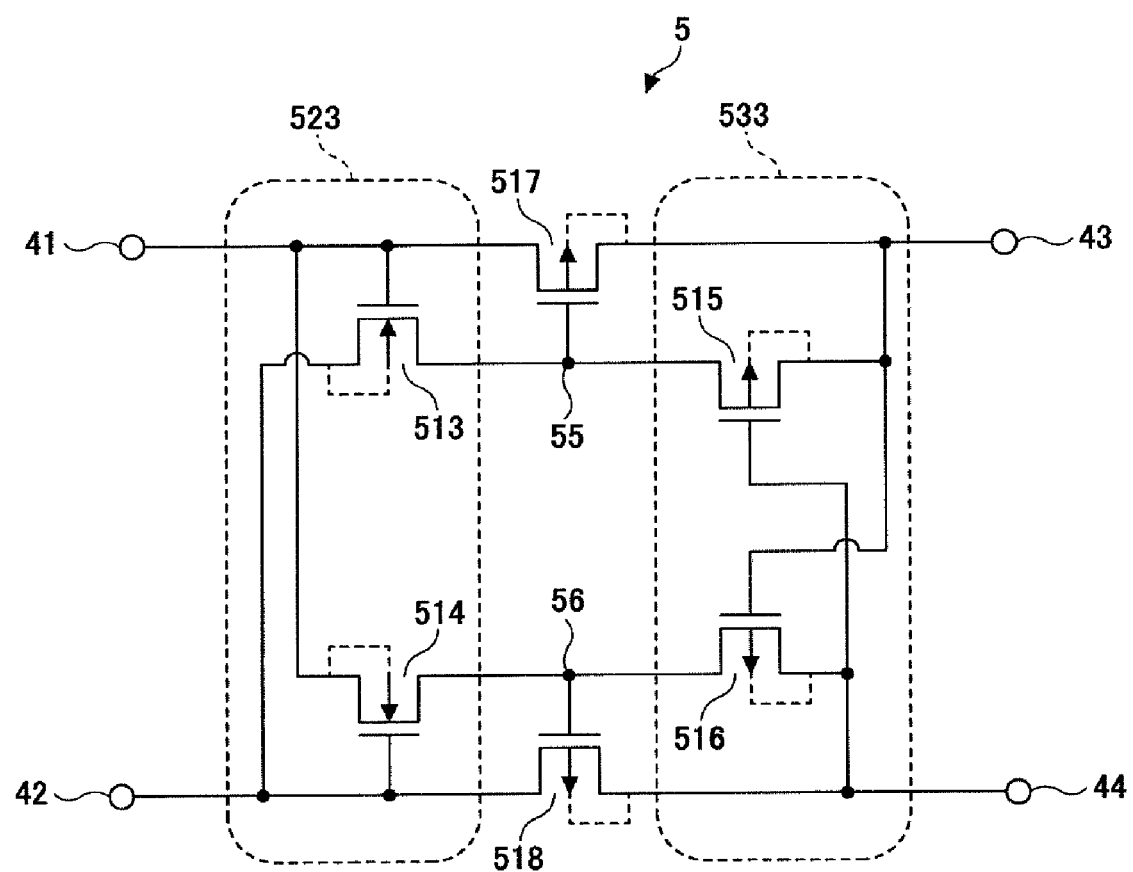
FIG. 23 shows a circuit diagram of a first example of a P-type second control unit in the charge pump circuit.

FIG. 23 shows a circuit diagram of a first example of the P-type second control unit 5. In the P-type second control unit 5 shown in FIG. 23, as the gate-control switch units used in the first charge transfer circuit, a SW NMOS transistor 513 and a SW PMOS transistor 515 are connected in series. In the second charge transfer circuit, a SW NMOS transistor 514 and a SW PMOS transistor 516 are connected in series.

These SW NMOS and PMOS transistors need only to perform a switch operation, so that they can be realized with transistors requiring a smaller area than the current transistors.

With regard to the SW NMOS transistor 513 in the first charge transfer circuit, the source terminal and the substrate terminal are connected to the input-side node 42 of the second charge transfer circuit; the gate terminal is connected to the input-side node 41 of the first charge transfer circuit; and the drain terminal is connected to the drain terminal of the SW PMOS transistor 515.

With regard to the SW PMOS transistor 515 in the first charge transfer circuit, the source terminal and the substrate terminal are connected to the output side node 43 of the first charge transfer circuit; and the gate terminal is connected to the output side node 44 of the second charge transfer circuit. The node 55 between the drain terminals of the SW NMOS transistor 513 and the SW PMOS transistor 515 is connected to the gate terminal of the CTS PMOS transistor 517.

With regard to the SW NMOS transistor 514 in the second charge transfer circuit, the source terminal and the substrate terminal are connected to the input-side node 41 of the first charge transfer circuit; the gate terminal is connected to the input-side node 42 of the second charge transfer circuit; and the drain terminal is connected to the drain terminal of the SW PMOS transistor 516.

With regard to the SW PMOS transistor 516 in the second charge transfer circuit, the source terminal and the substrate terminal are connected to the output side node 44 of the second charge transfer circuit; and the gate terminal is connected to the output side node 43 of the first charge transfer circuit.

The first example of the P-type second control unit 5 shown in FIG. 23 includes a third NMOS block 523 and a third PMOS block 533 for supplying a potential to the gate of the MOS transistor 517. The third NMOS block 523 includes the SW NMOS transistor 513 and the SW NMOS transistor 514. The third PMOS block 533 includes the SW PMOS transistor 515 and the SW PMOS transistor 516.

When the capacitors 51 and 54 are fed with the GND potential and the capacitors 52 and 53 are fed with the VDD potential as shown in FIG. 21, there is a potential difference VDD between the nodes 42 and 41 in the third NMOS transistor block 523 of FIG. 23. When the potential difference is equal to or greater than Vtn, the SW NMOS transistor 514 turns on while the SW NMOS transistor 513 turns off.

Similarly, in the third PMOS transistor 533 block, there is a potential difference −VDD between the nodes 44 and 43. When the potential difference is equal to or greater than −|Vtp|, the SW PMOS transistor 515 turns on while the SW PMOS transistor 516 turns off.

By the operations of the third NMOS transistor block 523 and the third PMOS transistor block 533, the potential of the node 55 becomes equal to the potential 3×VDD of the node 43 because the SW NMOS transistor 513 turns off while the SW PMOS transistor 515 turns on. The potential of the node 56 becomes equal to the potential VDD of the node 41 because the SW NMOS transistor 514 turns on while the SW PMOS transistor 516 turns off.

Figure 24:
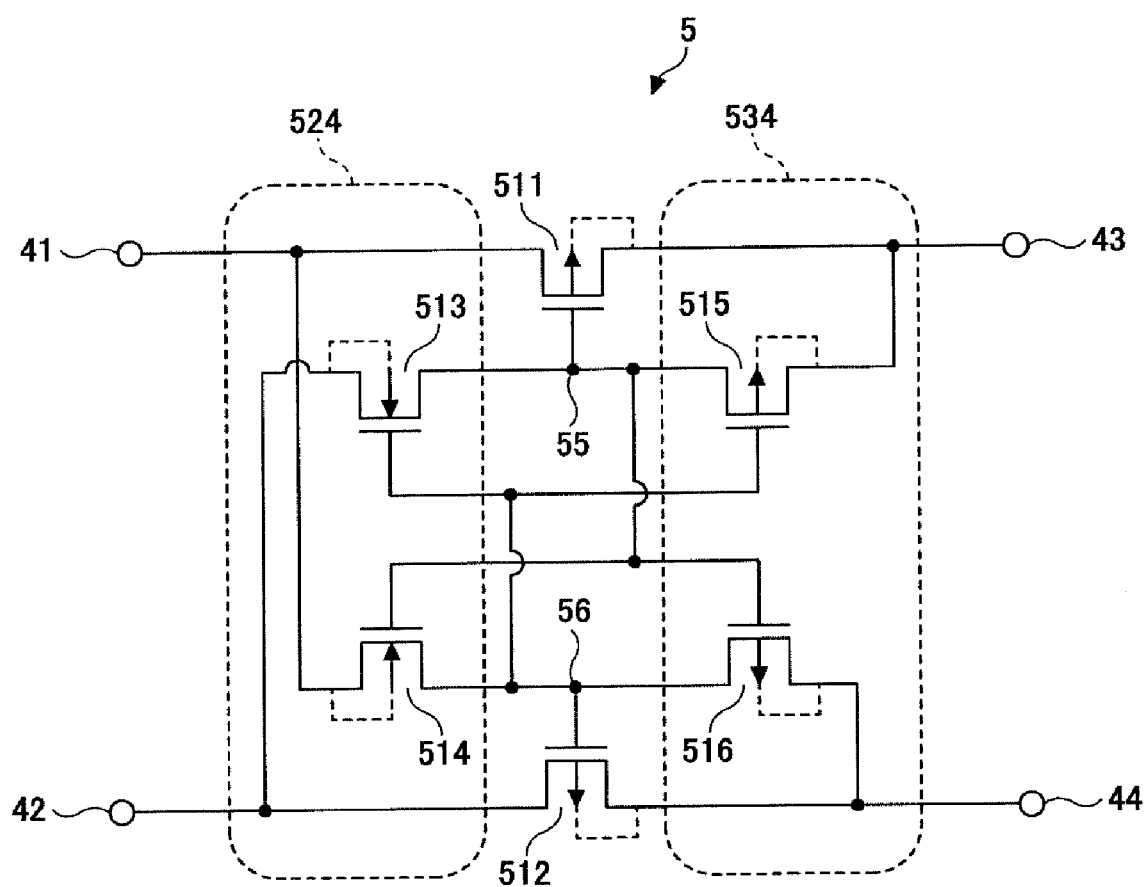
FIG. 24 shows a second example of the P-type second control unit in the charge pump circuit.

FIG. 24 shows a circuit diagram of a second example of the P-type second control unit 5. In the P-type second control unit 5 shown in FIG. 24, as the gate-control switch units used in the first charge transfer circuit, the SW NMOS transistor 513 and the SW PMOS transistor 515 are connected in series. In the second charge transfer circuit, the SW NMOS transistor 514 and the SW PMOS transistor 516 are connected in series.

In the first charge transfer circuit, the gate terminal of the SW NMOS transistor 513 and the gate terminal of the SW PMOS transistor 515 are connected. In the second charge transfer circuit, the gate terminal of the SW NMOS transistor 514 and the gate terminal of the SW PMOS transistor 516 are connected.

In the first charge transfer circuit, the source terminal of the SW NMOS transistor 513 and the substrate terminal are connected to the input-side node 42 of the second charge transfer circuit. The source terminal of the SW PMOS transistor 515 and the substrate terminal are connected to the output side node 43 of the first charge transfer circuit. The drain terminal of the SW NMOS transistor 513 is connected to the drain terminal of the SW PMOS transistor 515. The node 55 between the drain terminals is connected to the gate terminal of the CTS PMOS transistor 511. The gate terminals of the SW NMOS transistor 513 and the SW PMOS transistor 515 are connected to the node 56 between the drain terminal of the SW NMOS transistor 514 and the drain terminal of the SW PMOS transistor 516 in the second charge transfer circuit.

In the second charge transfer circuit, the source terminal of the SW NMOS transistor 514 and the substrate terminal are connected to the input-side node 41 of the first charge transfer circuit. The source terminal of the SW PMOS transistor 516 and the substrate terminal are connected to the output side node 44 of the second charge transfer circuit. The drain terminal of the SW NMOS transistor 514 is connected to the drain terminal of the SW PMOS transistor 516; the node 56 between the drain terminals is connected to the gate terminal of the CTS PMOS transistor 512. The gate terminal of the SW NMOS transistor 514 and that of the SW PMOS transistor 516 are connected to the node 55.

The second example of the P-type second control unit 5 shown in FIG. 24 includes a fourth NMOS transistor block 524 and a fourth PMOS transistor block 534 for supplying potentials to the gate terminals of the PMOS transistors 511 and 512.

The fourth NMOS transistor block 524 is formed by the SW NMOS transistor 513 and the SW NMOS transistor 514. The fourth PMOS transistor block 534 is formed by the SW PMOS transistor 515 and the SW PMOS transistor 516.

In the second example of the P-type second control unit 5 shown in FIG. 24, when the capacitors 51 and 54 are fed with the GND potential and the capacitors 52 and 53 are fed with the VDD potential, as in FIG. 21, the potential of the node 55 is equal to or greater than 2×VDD and equal to or smaller than 3×VDD because the source potential of the SW NMOS transistor 513 is 2×VDD and that of the SW PMOS transistor 515 is 3×VDD.

Because the source potential of the SW NMOS transistor 514 is VDD and the source potential of the SW PMOS transistor 516 is VDD, the potential of the node 56 is equal to or greater than VDD and equal to or smaller than 2×VDD.

Because of the above potential relationships, the SW NMOS transistor 513 turns off and the SW PMOS transistor 515 turns on, whereby the potential of the node 55 becomes equal to 3×VDD. Further, because the SW NMOS transistor 514 turns on and the SW PMOS transistor 516 turns off, the potential of the node 56 becomes equal to VDD.

The third NMOS and PMOS transistor blocks 523 and 533 and the fourth NMOS and PMOS transistor blocks 524 and 534 may be used in various combinations. Two of such combinations are described in the following with respect to FIGS. 25 and 26 as third and fourth examples.

Figure 25:
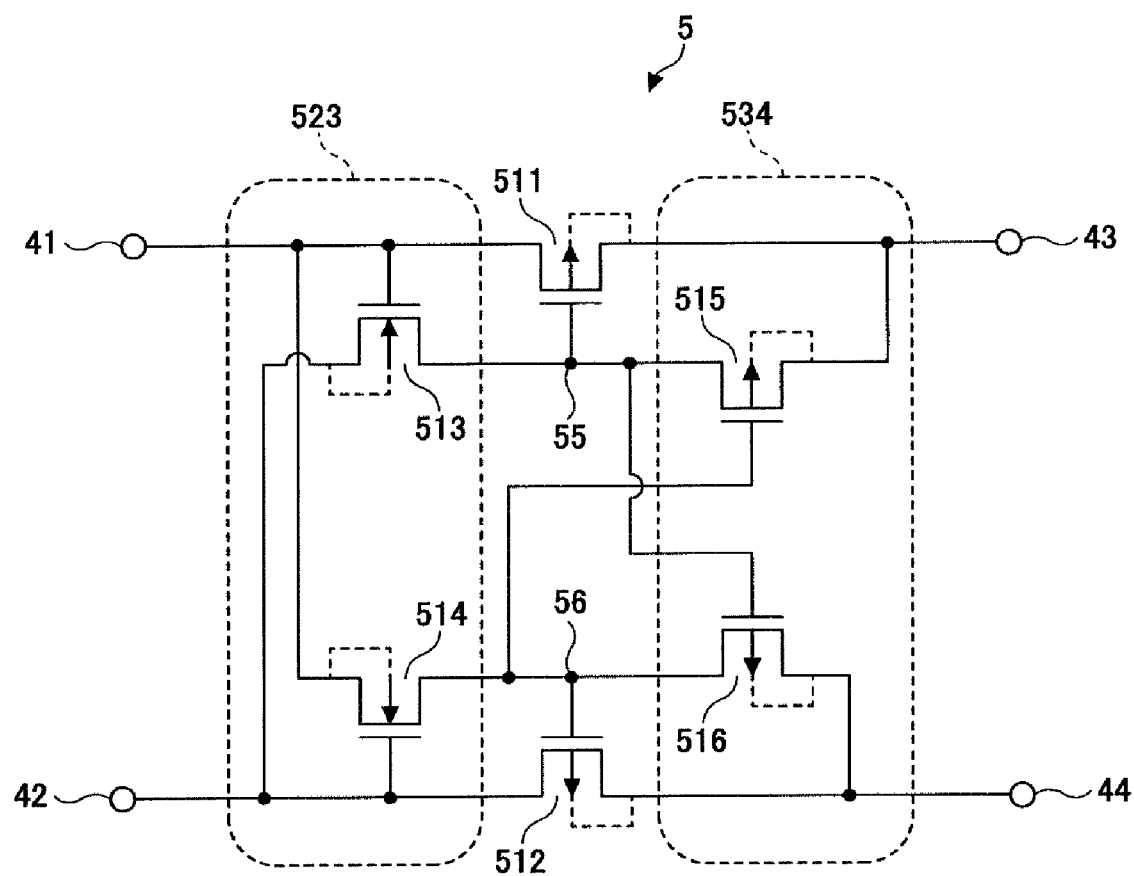
FIG. 25 shows a third example of the P-type second control unit.

FIG. 25 shows a circuit diagram of the third example of the P-type second control unit 5. In the P-type second control unit 5 shown in FIG. 25, the third NMOS transistor block 523 and the fourth PMOS transistor block 534 are used in combination.

As the gate-control switch units in the first charge transfer circuit, the SW NMOS transistor 513 and the SW PMOS transistor 515 are connected in series. As the gate-control switch units in the second charge transfer circuit, the SW NMOS transistor 514 and the SW PMOS transistor 516 are connected in series.

In the first charge transfer circuit, the source terminal of the SW NMOS transistor 513 and the substrate terminal are connected to the input-side node 42 of the second charge transfer circuit; and the gate terminal is connected to the input-side node 41 of the first charge transfer circuit. The drain terminal of the SW NMOS transistor 513 is connected to the drain terminal of the SW PMOS transistor 515; the node 55 between the drain terminals is connected to the gate terminal of the PMOS transistor 511 as the charge transfer switch.

In the first charge transfer circuit, the source terminal of the SW PMOS transistor 515 and the substrate terminal are connected to the output side node 43 of the first charge transfer circuit. The gate terminal is connected to the node 56 between the drain terminal of the SW NMOS transistor 514 and that of the SW PMOS transistor 516 in the second charge transfer circuit.

In the second charge transfer circuit, the source terminal of the SW NMOS transistor 514 and the substrate terminal are connected to the input-side node 41 of the first charge transfer circuit; and the gate terminal is connected to the input-side node 42 of the second charge transfer circuit. The drain terminal of the SW NMOS transistor 514 is connected to the drain terminal of the SW PMOS transistor 516; the node 56 between the drain terminals is connected to the gate terminal of the PMOS transistor 512 of the charge transfer switch.

In the second charge transfer circuit, the source terminal of the SW PMOS transistor 516 and the substrate terminal are connected to the output side node 44 of the second charge transfer circuit; the gate terminal is connected to the node 55.

In the P-type second control unit 5 shown in FIG. 25, too, the aforementioned ideal on/off-states can be achieved.

Figure 26:
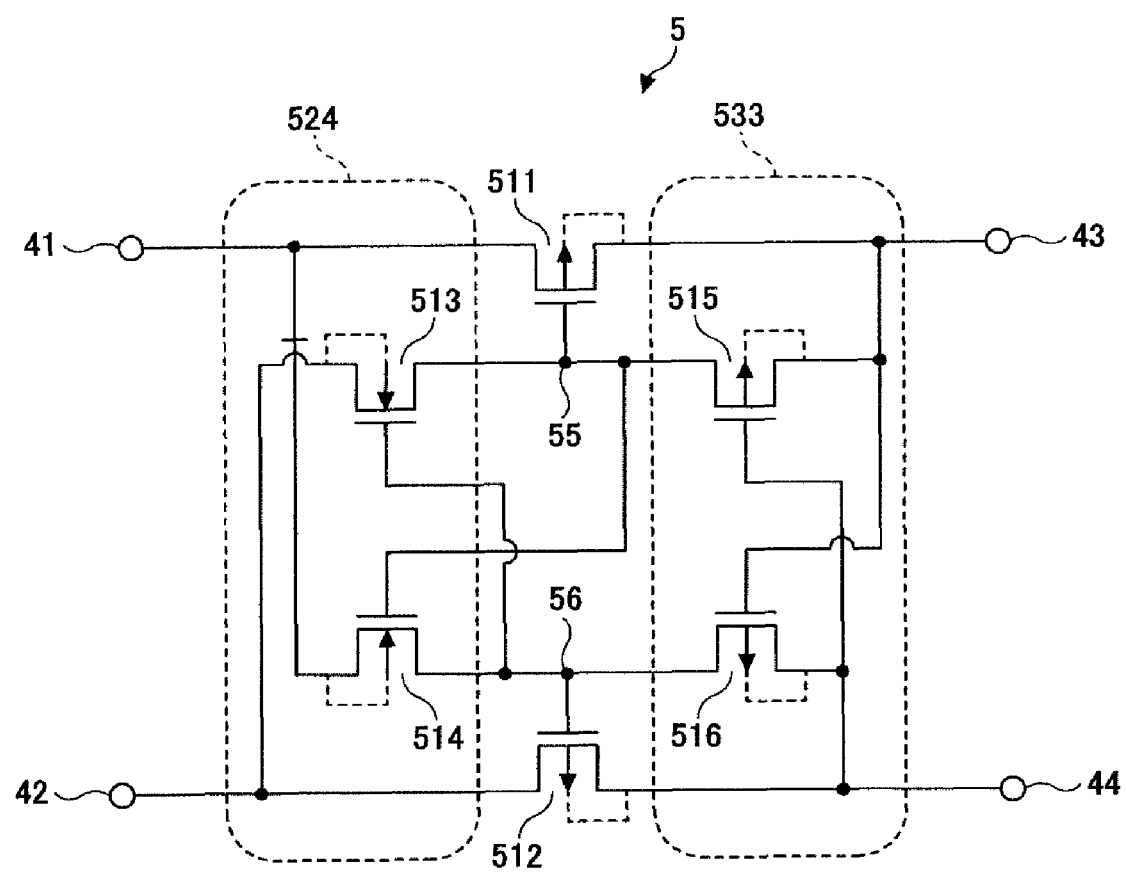
FIG. 26 shows a fourth example of the P-type second control unit.

FIG. 26 shows a circuit diagram of the fourth example of the P-type second control unit 5. In the P-type second control unit 5 shown in FIG. 26, the fourth NMOS transistor block 524 and the third PMOS transistor block 533 are used in combination.

As the gate-control switch units used in the first charge transfer circuit, the SW NMOS transistor 513 and the SW PMOS transistor 515 are connected in series. As the gate-control switch units used in the second charge transfer circuit, the SW NMOS transistor 514 and the SW PMOS transistor 516 are connected in series.

In the first charge transfer circuit, the source terminal of the SW NMOS transistor 513 and the substrate terminal are connected to the input-side node 42 of the second charge transfer circuit. The gate terminal is connected to the node 56 between the drain terminal of the SW NMOS transistor 514 and that of the SW PMOS transistor 516 in the second charge transfer circuit. The drain terminal of the SW NMOS transistor 513 is connected to the drain terminal of the SW PMOS transistor 515; the node 55 between the drain terminals is connected to the gate terminal of the PMOS transistor 511 as the charge transfer switch.

In the first charge transfer circuit, the source terminal of the SW PMOS transistor 515 and the substrate terminal are connected to the output side node 43 of the first charge transfer circuit; the gate terminal is connected to the output side node 44 of the second charge transfer circuit.

In the second charge transfer circuit, the source terminal of the SW NMOS transistor 514 and the substrate terminal are connected to the input-side node 41 of the first charge transfer circuit; the gate terminal is connected to the node 55. The drain terminal of the SW NMOS transistor 514 is connected to the drain terminal of the SW PMOS transistor 516; the node 56 between the drain terminals is connected to the gate terminal of the CTS PMOS transistor 512.

In the second charge transfer circuit, the source terminal of the SW PMOS transistor 516 and the substrate terminal are connected to the output side node 44 of the second charge transfer circuit; the gate terminal is connected to the output side node 43 of the first charge transfer circuit.

In the P-type second control unit 5 shown in FIG. 26, too, the aforementioned ideal on/off-states can be achieved.

Figure 27:
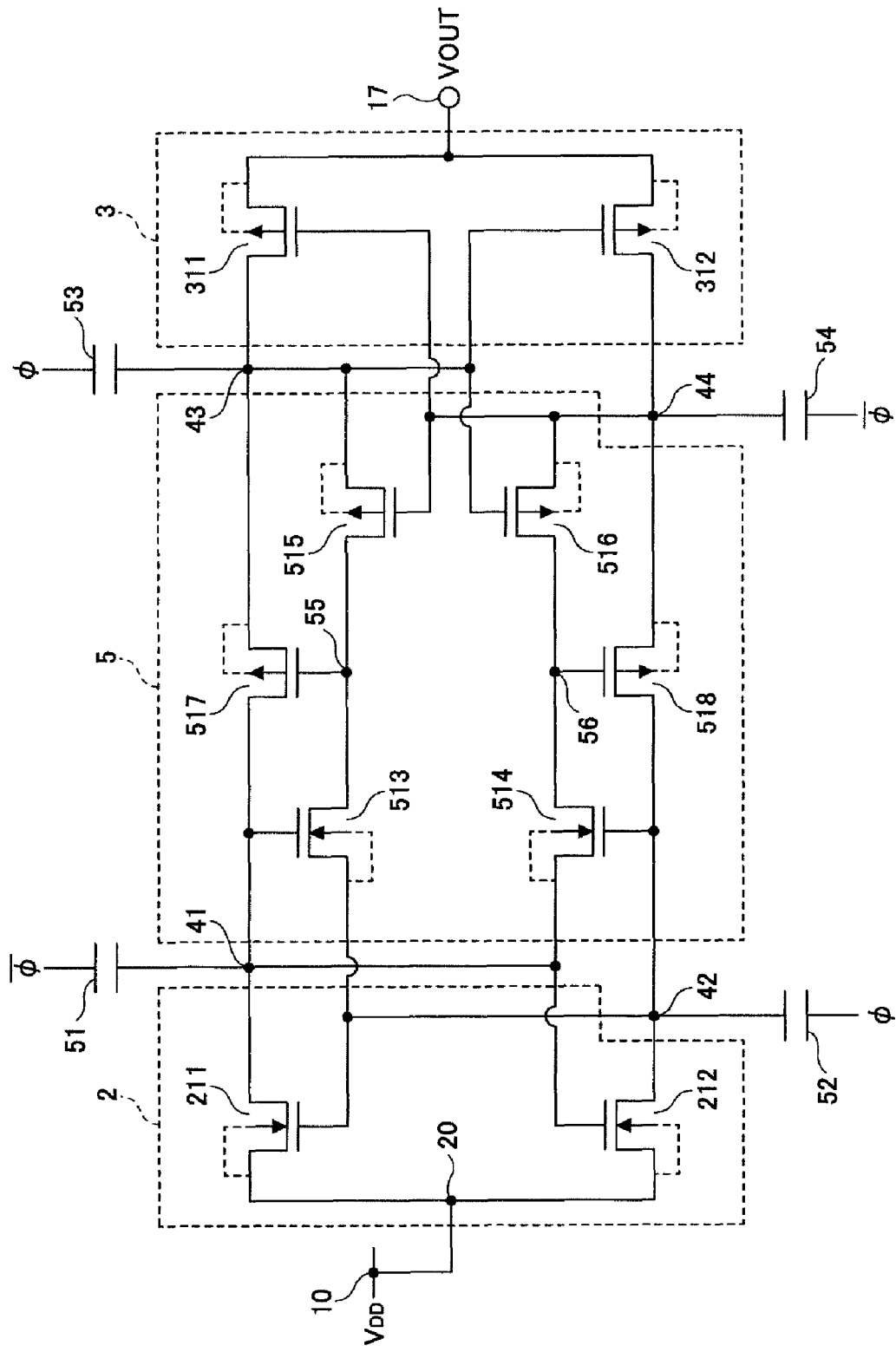
FIG. 27 shows an embodiment of the charge pump circuit in which PMOS transistors are used as the charge transfer switches in the second control unit.

FIG. 27 shows an example of the 2-stage charge pump shown in FIG. 9 that employs the first control unit shown in FIG. 11, the P-type second control unit shown in FIG. 23, and the voltage comparison unit shown in FIG. 12.

In the circuit shown in FIG. 27, when the clock signal φ is VDD, the potential of the node 42 increases to 2×VDD, whereby the CTS NMOS transistor 211 turns on. As a result, the potential of the node 41 on the first charge transfer circuit side becomes equal to the potential VDD of the power supply input 10. Thus, the potential of the node 41 on the first charge transfer circuit side becomes equal to the potential VDD of the power supply input 10. The CTS NMOS transistor 212 turns off.

Because the potential of the node 41 is VDD and the potential of the node 42 on the second charge transfer circuit side is 2×VDD, the SW NMOS transistor 513 turns off. Because the SW NMOS transistor 514 turns on, the potential of the node 56 of the second charge transfer circuit is lowered close to the first node 41. As a result, the CTS PMOS transistor 518 becomes close to the on-state. Further, because the CTS PMOS transistor 518 is close to the on-state, the node 44 on the output side of the second charge transfer circuit has the same potential as the potential 2×VDD of the node 42.

Due to the potentials of the nodes 41 and 42, the SW NMOS transistor 513 turns off. Thus, the potential of the node 55 on the first charge transfer circuit side is cut off from the potential of the node 41 and increases. As a result, the CTS PMOS transistor 517 becomes close to the off-state.

Because the CTS PMOS transistor 517 is close to the off-state and the capacitor 53 is fed with the VDD potential, the 3×VDD potential is obtained at the node 43 on the output side of the first charge transfer circuit.

Further, because the CTS PMOS transistor 518 is close to the on-state, the potential of the node 44 on the output side of the second charge transfer circuit becomes equal to the potential 2×VDD of the node 42.

Because the potential of the node 43 is 3×VDD and the potential of the node 44 is 2×VDD, the SW PMOS transistor 515 turns on. In addition, the SW NMOS transistor 513 turns off. Accordingly, the potential of the node 55 is fixed to the potential 3×VDD of the node 43 on the output side, so that the CTS PMOS transistor 517 can be reliably turned off.

Given that the SW PMOS transistor 516 turns off and the SW NMOS transistor 514 turns on, the potential of the node 56 in the switch unit is fixed to the potential VDD of the node 41 on the input side, so that the CTS PMOS transistor 517 can be reliably turned on.

Further, due to the potentials of the nodes 43 and 44, the CTS PMOS transistor 311 turns on, whereby the potential 3×VDD of the node 43 on the output side is outputted to the output terminal 17. In this case, the CTS PMOS transistor 312 is in the off-state, so that the potential 2×VDD of the node 44 on the output side is cut off from the output terminal 17.

Because the two lines of the charge transfer circuits are symmetrically arranged in the circuit of the present embodiment, a boosting operation can be performed by closing or opening the corresponding gate-control switches even when the clock signal ϕ is GND.

In the present embodiment, the P-type second control unit 5 may employ any of the configurations shown in FIGS. 23 through 26 in order to perform the boosting operation.

Figure 28:
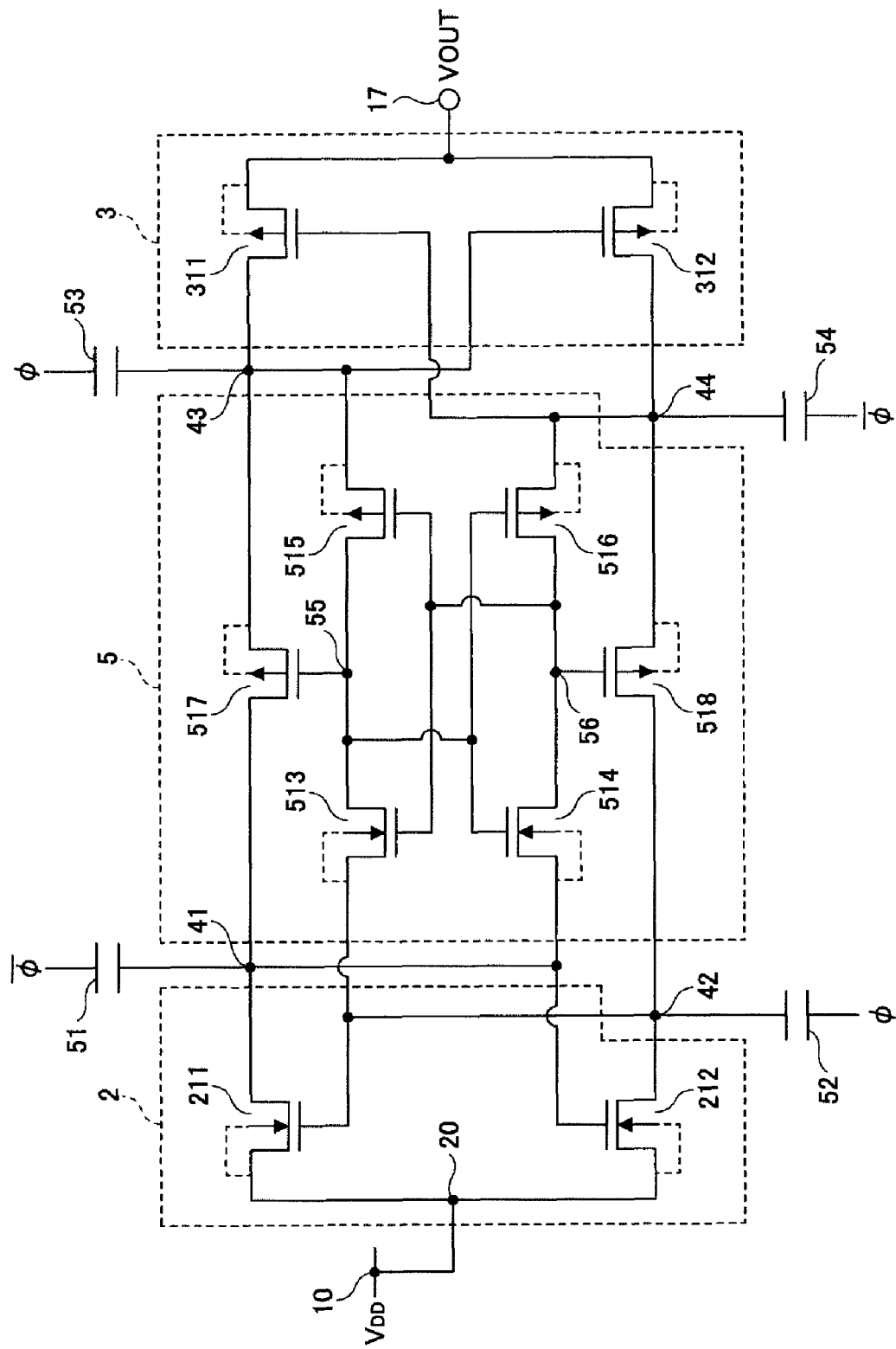
FIG. 28 shows another embodiment of the charge pump circuit in which PMOS transistors are used as the charge transfer switches in the second control unit.

FIG. 28 shows an example of the 2-stage charge pump shown in FIG. 9 that employs the first control unit shown in FIG. 11, the P-type second control unit shown in FIG. 24, and the voltage comparison unit shown in FIG. 12.

In this example, too, as described above, the ideal on/off-states can be achieved in the NMOS transistors 211 and 212, the PMOS transistors 517 and 518, and the PMOS transistors 311 and 312 as the charge transfer switches, so that a boosting operation can be performed by closing or opening the corresponding gate-control switches.

In the foregoing embodiments, the 2-stage charge pump booster circuits have been described in which one each of the first control unit 2, the second control unit 4 or 5, and the voltage comparison output unit 3 are connected, wherein each node is allocated a capacitor. In these embodiments, the charge transfer switches can be accurately controlled, so that a 3×VDD voltage can be stably obtained at the output terminal.

Figure 29:
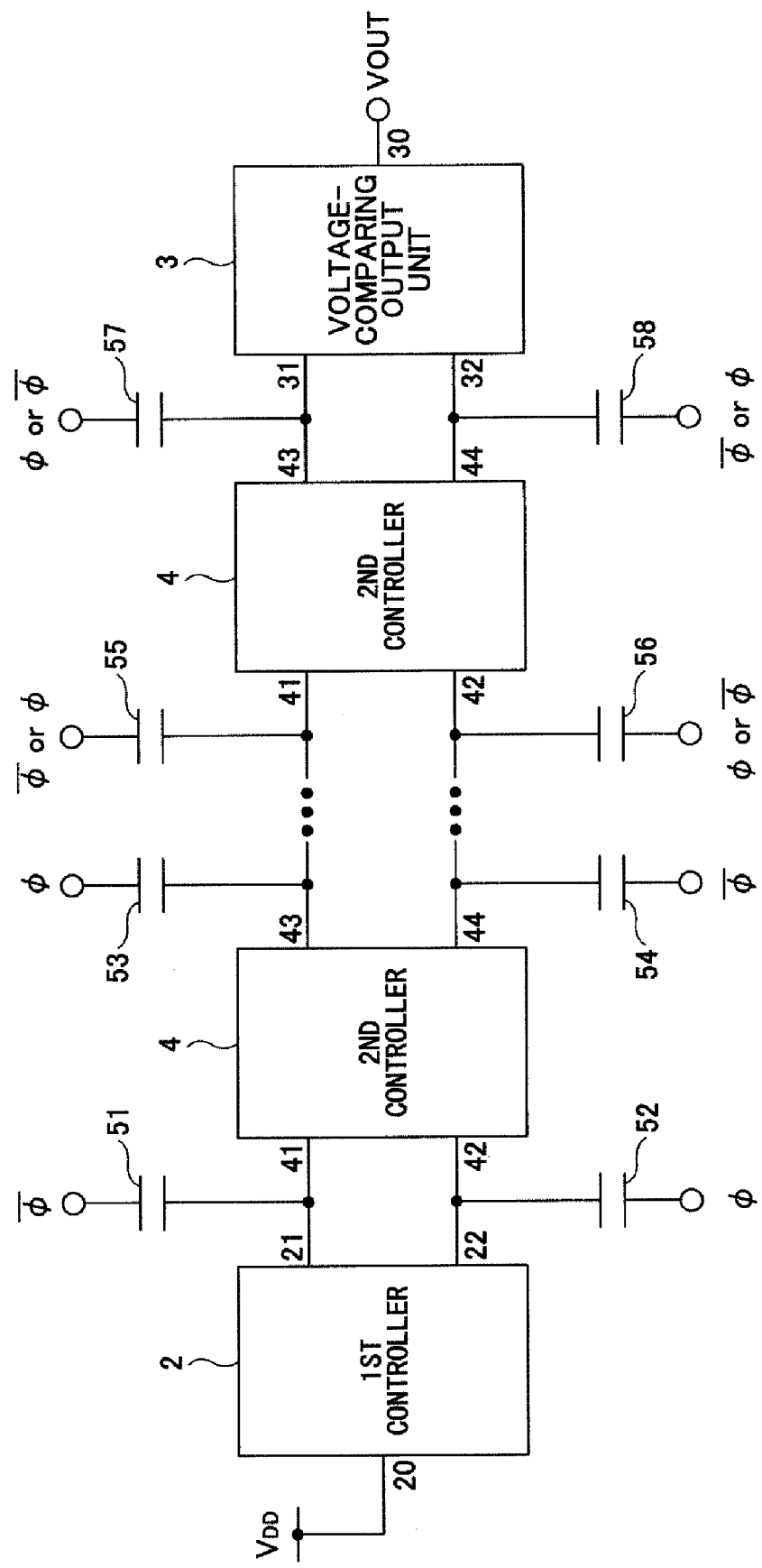
FIG. 29 shows a block diagram of a voltage generating circuit according to an embodiment of the present invention in which an N-stage charge pump circuit is used.

However, depending on the particular purpose of use, even higher voltages may be required. In such a case, the number N of stages in the charge pump circuit may be increased, as shown in FIG. 29. For this purpose, the first control unit may be used as a first-stage control circuit, the second control unit may be used for the second to the N-th stages, and the voltage comparison output unit may be used for the output of the N-th stage. In this way, a higher voltage can be obtained.

Concerning the connections between the blocks in FIG. 29, the first node 21 of an a-th stage or the 9th node 43 may be connected to the 7th node 41 in the (a+1)th stage; the second node 22 of the a-th stage or the 10th node 44 may be connected to the 8th node 42 of the (a+1)th stage (where N is an integer of 2 or greater, and a is an integer between 1 and N−1). In this way, a higher voltage can be obtained The 9th node 43 of the N-th stage second control unit may be connected to the third node 31 of the voltage comparison output unit. The 10th node 44 of the N-th stage second control unit may be connected to the 4th node 32 of the voltage comparison output unit. Capacitors are connected to the individual nodes in the circuit.

Figure 30:
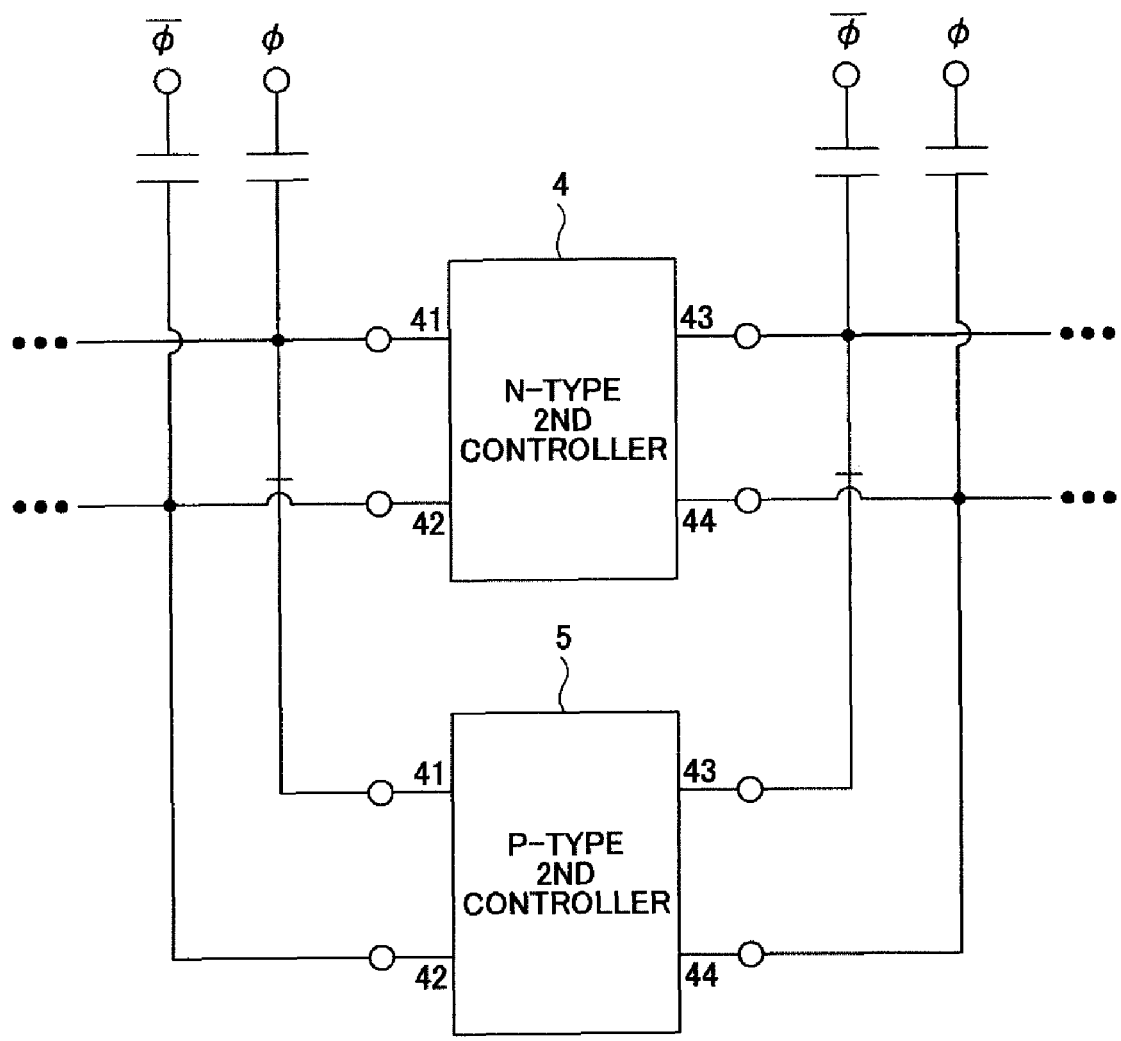
FIG. 30 shows a booster circuit of the voltage generating circuit according to another embodiment of the present invention in which an N-stage charge pump circuit is used.

It is also possible, as shown in FIG. 30, to connect the N-type second control unit and the P-type second control unit in parallel. In this case, any of the examples of the N-type second control unit shown in FIGS. 15 through 18 may be used. Also, the P-type second control unit may be provided by any of the examples of the P-type second control unit shown in FIGS. 23 through 26.

Although this invention has been described in detail with reference to certain embodiments, variations and modifications exist within the scope and spirit of the invention as described and defined in the following claims.

The present application is based on the Japanese Priority Application No. 2008-070205 filed Mar. 18, 2008, the entire contents of which are hereby incorporated by reference.

What is claimed is:

1. A voltage generating circuit comprising:
a power supply input node;
an output terminal node; and
a multi-stage charge pump booster circuit disposed between the power supply input node and the output terminal node,
wherein the multi-stage charge pump booster circuit includes plural charge transfer switches connected in series between the power supply input node and the output terminal node, forming two or more lines of charge transfer circuits that are operated by clock signals that are out of phase with each other,
the multi-stage charge pump booster circuit further including capacitors connected on one end to nodes of the charge transfer circuits and driven on another end by the out-of-phase clock signals,
wherein the charge transfer circuits include a first control unit, a second control unit, and a voltage comparison output unit,
the first control unit including a charge transfer switch comprising a NMOS transistor configured to transfer a charge from the power supply input node to each of the capacitors in a first-stage,
the second control unit including a charge transfer switch comprising an NMOS transistor configured to transfer a charge from a predetermined one of the capacitors in the first stage to the capacitor in a next stage, the second control unit further including a switch unit configured to selectively supply a signal from a node of the previous stage or a subsequent stage to the gate terminal of the charge transfer switch of the second control unit, depending on the phase of the clock signal, and
the voltage comparison output unit including a charge transfer switch comprising a PMOS transistor configured to transfer a charge from each of the capacitors in a final stage to the output node, the switching unit of the second control unit includes a first switch element and a second switch element connected in series for each of a first and charge transfer circuit and a second charge transfer circuit, wherein, in the first charge transfer circuit, the NMOS transistor of the second control unit is connected at a gate terminal thereof to a node between the first and the second switch elements, at a source terminal thereof and a substrate terminal to an input-side node of the first charge transfer circuit via which a charge is transferred from the capacitor in the previous stage, and at a drain terminal thereof to an output side node of the first charge transfer circuit via which a charge is transferred to the capacitor in the subsequent stage, wherein, in the second charge transfer circuit, the NMOS transistor of the second control unit is connected at a gate terminal thereof to a node between the first and the second switch elements, at a source terminal thereof and a substrate terminal to an input-side node of the second charge transfer circuit via which a charge is transferred from the capacitor in the previous stage, and at a drain terminal thereof to an output side node of the second charge transfer circuit via which a charge is transferred to the capacitor in the subsequent stage, wherein, in the first charge transfer circuit, the first switch element of the switch unit of the second control unit is connected to the input-side node of the first charge transfer circuit, and the second switch element of the switch unit is connected to the output side node of the second charge transfer circuit, and wherein, in the second charge transfer circuit, the first switch element of the switch unit of the second control unit is connected to the input-side node of the second charge transfer circuit, and the second switch element of the switch unit is connected to the output side node of the first charge transfer circuit, wherein the first switch element comprises a switch NMOS transistor and the second switch element comprises a switch PMOS transistor, wherein, in the first charge transfer circuit, the switch NMOS transistor for the first switch element is connected at a source terminal thereof and a substrate terminal to the input-side node of the first charge transfer circuit, at a gate terminal thereof to the input-side node of the second charge transfer circuit, and at a drain terminal thereof to a drain terminal of the PMOS transistor forming the second switch, the PMOS transistor forming the second switch element is connected at a source terminal thereof and a substrate terminal to the output side node of the second charge transfer circuit, and at a gate terminal thereof to the output side node of the first charge transfer circuit, and wherein, in the second charge transfer circuit, the switch NMOS transistor for the first switch element is connected at a source terminal thereof and a substrate terminal to the input-side node of the second charge transfer circuit, at a gate terminal thereof to the input-side node of the first charge transfer circuit, and at a drain terminal thereof to the drain terminal of the PMOS transistor forming the second switch, and the PMOS transistor forming the second switch is connected at a source terminal thereof and a substrate terminal to the output side node of the first charge transfer circuit, and at a gate terminal thereof to the output side node of the second charge transfer circuit.

* * * * *